United States Patent
Murakami

(10) Patent No.: US 11,126,831 B2
(45) Date of Patent: Sep. 21, 2021

(54) OBJECT RECOGNITION METHOD, DEVICE, SYSTEM, AND PROGRAM

(71) Applicant: FUJITSU LIMITED, Kawasaki (JP)

(72) Inventor: Ryo Murakami, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/676,527

(22) Filed: Nov. 7, 2019

(65) Prior Publication Data
US 2020/0074161 A1 Mar. 5, 2020

Related U.S. Application Data

(63) Continuation of application No. PCT/JP2017/017695, filed on May 10, 2017.

(51) Int. Cl.
*G06K 9/00* (2006.01)
*G06T 7/20* (2017.01)

(52) U.S. Cl.
CPC ..... *G06K 9/00342* (2013.01); *G06K 9/00369* (2013.01); *G06K 9/00718* (2013.01); *G06T 7/20* (2013.01); *G06T 2207/30196* (2013.01)

(58) Field of Classification Search
CPC .......... G06K 9/00342; G06K 9/00369; G06K 9/00718; G06T 7/20; G06T 2207/30196; G06T 2207/20076; G06T 2207/10028; G06T 7/00
See application file for complete search history.

(56) References Cited

U.S. PATENT DOCUMENTS

| | | | |
|---|---|---|---|
| 9,235,928 B2 | 1/2016 | Medioni et al. | |
| 2010/0302247 A1* | 12/2010 | Perez | G06K 9/00335 345/440 |
| 2011/0267344 A1 | 11/2011 | Germann et al. | |
| 2012/0275654 A1 | 11/2012 | Fujiki et al. | |

(Continued)

FOREIGN PATENT DOCUMENTS

| | | |
|---|---|---|
| EP | 3624059 A1 | 3/2020 |
| JP | 10-149445 A | 6/1998 |

(Continued)

OTHER PUBLICATIONS

Zuffi, Silvia, "Shape Models of the Human Body for Distributed Inference", Jan. 1, 2015, XP055685567, Retrieved from the Internet: URL:https://www.is.mpg.de/uploads_file/attachment/attachment/199/thesis.pdf, 162 pages.

(Continued)

*Primary Examiner* — Tracy Y. Li
(74) *Attorney, Agent, or Firm* — Fujitsu Patent Center

(57) ABSTRACT

An object recognition method executed by a computer includes obtaining point cloud data related to a surface of an object having a plurality of joints, from a sensor configured to obtain positional information in three dimensions; deriving or obtaining first parameters representing a position and an axial direction for each of a plurality of parts of the object at a first point in time; and deriving the first parameters at a second point in time after the first point in time, based on the point cloud data at the second point in time, the first parameters at the first point in time, and one or more geometric models each having an axis.

19 Claims, 14 Drawing Sheets

(56) References Cited

U.S. PATENT DOCUMENTS

| | | | |
|---|---|---|---|
| 2014/0072175 | A1 | 3/2014 | Hasler et al. |
| 2014/0334670 | A1* | 11/2014 | Guigues .................. G06K 9/469 382/103 |
| 2015/0206003 | A1 | 7/2015 | Haker et al. |
| 2016/0110595 | A1 | 4/2016 | Wang et al. |
| 2016/0335790 | A1* | 11/2016 | Fleishman ......... G06K 9/00355 |
| 2017/0186165 | A1 | 6/2017 | Taylor et al. |
| 2017/0337732 | A1 | 11/2017 | Tamersoy et al. |
| 2017/0347055 | A1* | 11/2017 | Dore ......................... G06T 7/60 |

FOREIGN PATENT DOCUMENTS

| | | |
|---|---|---|
| JP | 2010-015472 A | 1/2010 |
| JP | 2011-179907 A | 9/2011 |
| JP | 2015-102913 A | 6/2015 |

OTHER PUBLICATIONS

Ye, Mao et al., "A Survey on Human Motion Analysis from Depth Data", Dagstuhl 2012 Seminar on Time-of-Flight Imaging and GCPR 2013 Workshop on Imaging New Modalities In: "12th European Conference on Computer Vision, ECCV 2012", Jan. 1, 2013, Springer Berlin Heidelberg, XP055657330, vol. 8200, pp. 149-187.

Ganapathi, Varun et al., "Real-Time Human Pose Tracking from Range Data", Oct. 7, 2012, 12th European Conference on Computer Vision, ECCV 2012; [Lecture Notes in Computer Science], Springer Berlin Heidelberg, pp. 738-751, XP047019124.

Extended European Search Report dated Apr. 29, 2020 for corresponding European Patent Application No. 17909083.2, 13 pages.

Ye, Mao et al., "Real-time Simultaneous Pose and Shape Estimation for Articulated Objects Using a Single Depth Camera", in CVPR (2014), 8 pages.

Horiuchi, Eiichi, "Hemi-form Geometric Models for Single-scan 3D Point Clouds", Journal of the Robotics Society of Japan, vol. 32, No. 8, Oct. 15, 2014, pp. 57-66, with English Abstract.

Miyamoto, Arata et al., "Human Pose Estimation from 3D Object Skeleton using Articulated Cylindrical Human Model", Information Processing Society of Japan (IPSJ), SIG notes, May 19, 2006, vol. 2006, No. 51, pp. 137-144, with English Abstract.

International Search Report and Written Opinion of the International Searching Authority, with Partial Translation (Form PCT/ISA/210, 220, and 237), mailed in connection with PCT/JP2017/017695 dated Aug. 15, 2017. (19 pages).

International Search Report dated Oct. 3, 2017 for PCT/JP2017/028557, 2 pages.

Written Opinion of the International Search Authority dated Oct. 3, 2017 for PCT/JP2017/028557 with English Translation, 8 pages.

Yamauchi, K., et al., "Recognizing Walking Humans in 3D," Image Laboratory, vol. 20, No. 12, Dec. 10, 2009, op. 52-56, with Partial English Translation.

Extended European Search Report dated Jul. 27, 2020 for corresponding European Patent Application No. 17921327.7, 10 pages.

Barros, Jilliam Maria Diaz et al., "Real-Time Human Pose Estimation from Body-Scanned Point Clouds", Proceedings of the 10th International Conference on Computer Vision Theory and Applications, Jan. 1, 2015, pp. 553-560, XP055358213.

Loper, Matthew et al. "SMPL: A Skinned Multi-Person Linear Model", ACM Transactions On Graphics, ACM, NY, US, vol. 34, No. 6, Article 248, Nov. 2015, p. 248:1-248:16, XP058075343.

Zuffi, Silvia et al., "The Stitched Puppet: A Graphical Model of 3D Human Shape and Pose", 2015 IEEE Conference On Computer Vision and Pattern Recognition (CVPR), IEEE, Jun. 7, 2015, pp. 3537-3546, XP032793804.

Migniot, Cyrille et al., "Part-Based 3D Multi-Person Tracking using Depth Cue in a Top View", 2014 International Conference On Computer Vision Theory and Applications (VISAPP), Scitepress, vol. 3, Jan. 5, 2014, 8 pages, XP032792208.

Camomilla, Valentina et al., "Three-Dimensional Reconstruction of the Human Skeleton in Motion," Springer International Publishing AG 2017, pp. 1-29, Jan. 2017.

Munaro, Matteo et al., "3D Reconstruction of Freely Moving Persons for Re-Identification with a Depth Sensor," 2014 IEEE International Conference on Robotics & Automation (ICRA), Hong Kong Convention and Exhibition Center, May 31-Jun. 2014, pp. 4512-4519.

Slama, Rim et al., "Accurate 3D Action Recognition using Learning on the Grassmann Manifold," Aug. 14, 2014, HAL Archives Ouvertes, Pattern Recognition, pp. 1-48.

Alexiadis, Dimitrios et al., "An Integrated Platform for Live 3D Human Reconstruction and Motion Capturing," IEEE Transactions on Circuits and Systems for Video Technology, vol. 27, No. 4, pp. 798-813, Apr. 2017.

Gao, Zhiquan et al., "Leveraging Two Kinect Sensors for Accurate Full-Body Motion Capture," Sensors 2015, vol. 15, pp. 24297-24317, Sep. 22, 2015.

U.S. Office Action dated Apr. 21, 2021 for copending U.S. Appl. No. 16/782,063, 18 pages.

Huang, Chun-Hao, "Robust Human Body Shape and Pose Tracking," 2013 International Conference on 3D Vision, pp. 287-294.

* cited by examiner

FIG.10 r

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 |
| 4 | 1 | 1 | 0 | 0 | 0 | 0 | 0 | 0 | 0 | 0 | 0 | 0 | 0 |
| 5 | 1 | 1 | 0 | 1 | 0 | 0 | 0 | 0 | 0 | 0 | 0 | 0 | 0 |
| 6 | 1 | 1 | 0 | 1 | 1 | 0 | 0 | 0 | 0 | 0 | 0 | 0 | 0 |
| 7 | 1 | 1 | 0 | 0 | 0 | 0 | 0 | 0 | 0 | 0 | 0 | 0 | 0 |
| 8 | 1 | 1 | 0 | 0 | 0 | 0 | 1 | 0 | 0 | 0 | 0 | 0 | 0 |
| 9 | 1 | 1 | 0 | 0 | 0 | 0 | 1 | 1 | 0 | 0 | 0 | 0 | 0 |
| 10 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 1 | 0 | 0 | 0 |
| 12 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 1 | 0 |
| 14 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | k

OBJECT RECOGNITION METHOD, DEVICE, SYSTEM, AND PROGRAM

CROSS-REFERENCE TO RELATED APPLICATIONS

This application is a continuation application of International Application PCT/JP2017/017695 filed on May 10, 2017 and designated the U.S., the entire contents of which are incorporated herein by reference.

FIELD

The present disclosure relates to an object recognition method, an object recognition device, an object recognition system, and an object recognition program.

BACKGROUND

A technique has been known for tracking a skeleton of an object such as a person based on point cloud data scattered on the surface of the object (see, for example, Non-Patent Document 1). This technique assumes a mixture of Gaussian distributions as the distribution of the point cloud data, assumes that the center (feature point) of each Gaussian distribution is fixed to the surface of the object, and under these assumptions, tracks the feature points frame by frame to track the skeleton of the object.

PRIOR ART DOCUMENTS

Patent Documents

Non-Patent Document 1: M. Ye and R. Yang, "Real-time Simultaneous Pose and Shape Estimation for Articulated Objects Using a Single Depth Camera" in CVPR (2014)

SUMMARY

According to an aspect of the present disclosure, an object recognition method is provided that is executed by a computer. The method includes obtaining point cloud data related to a surface of an object having a plurality of joints, from a sensor configured to obtain positional information in three dimensions; deriving or obtaining first parameters representing a position and an axial direction for each of a plurality of parts of the object at a first point in time; and deriving the first parameters at a second point in time after the first point in time, based on the point cloud data at the second point in time, the first parameters at the first point in time, and one or more geometric models each having an axis.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 10 is an explanatory diagram of $_\chi kl'$;

DESCRIPTION OF EMBODIMENTS

In a conventional technique as described above, there is a problem of a relatively high computational load due to iterative calculation required for correcting deviations of the feature points for each frame. For example, in such a conventional technique as described above, in the case of executing iterative calculation repeated 10 times or more for each frame, even if using a GPU (Graphics Processing Unit), 30 fps would be expected as the limit. In contrast, according to embodiments, it is possible precisely recognize the joints or skeleton of an object with a relatively low computational load.

In the following, the embodiments will be described in detail with reference to the accompanying drawings. In the present description, unless otherwise noted, "deriving a parameter (e.g., parameters θ, as described below) means "deriving a value of the parameter".

Figure 1:
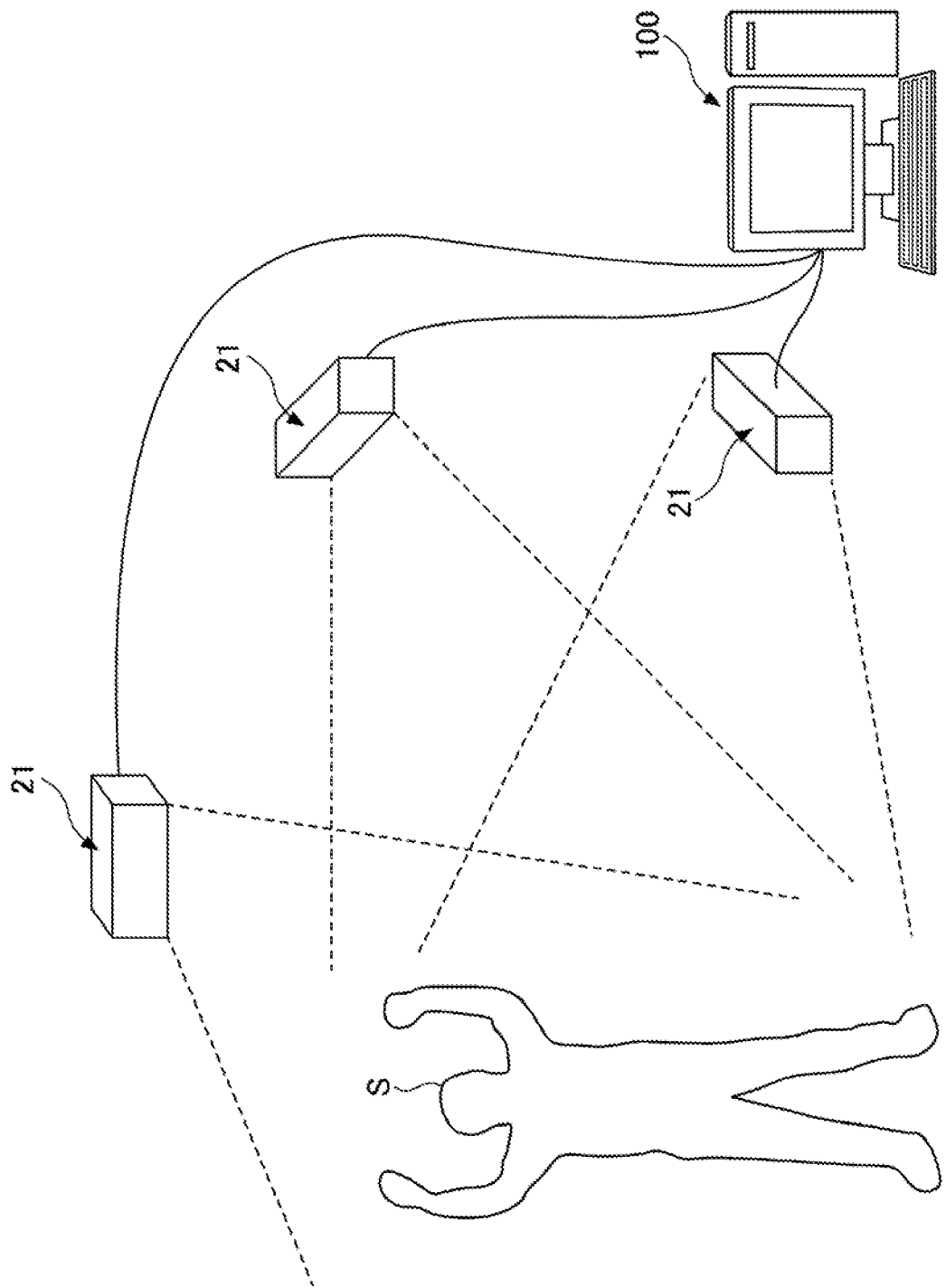
FIG. 1 is a schematic diagram illustrating an overall configuration of an object recognition system according to an embodiment.

FIG. 1 is a diagram schematically illustrating a schematic configuration of an object recognition system 1 according to an embodiment. In FIG. 1, a subject S (an example of an object) is illustrated for the sake of explanation.

The object recognition system 1 includes a distance image sensor 21 and an object recognition device 100.

The distance image sensor 21 obtains a distance image of the subject S. For example, the distance image sensor 21 is a three-dimensional image sensor to measure distances by sensing the entire space, so as to obtain a distance image (an example of point cloud data) having distance information for each pixel as in a digital image. The distance information may be obtained by any method. For example, a distance information obtainment method may be adopted that is based on an active stereo scheme in which a particular pattern is projected onto an object to be scanned by an image sensor, to obtain the distance by triangulation from geometric distortion of the projected pattern. Alternatively, a TOF (Time of Flight) scheme may be adopted in which an object is irradiated with a laser beam, and the reflected light is scanned by an image sensor to measure the distance from the phase shift.

Note that the distance image sensor 21 may be installed in a form in which the position is fixed or may be installed in a form in which the position is movable.

The object recognition device 100 recognizes joints and/or a skeleton of the subject S based on a distance image obtained from the distance image sensor 21. The recognition method will be described in detail later. The subject S is a human being or a humanoid robot having multiple joints. In the following example, the subject S is assumed to be a human being. The subject S may be a specific individual or an unspecified individual depending on the application. For example, if the application is to analyze movements of an athlete of a sport such as gymnastics, the subject S may be the athlete. Note that if the application is to analyze intense movements (fast and complex movements) in performance of gymnastics, figure skating, or the like, multiple distance image sensors 21 are favorably installed to obtain point cloud data close to the three-dimensional shape of the subject S, as schematically illustrated in FIG. 1.

The object recognition device 100 may be implemented in a form of a computer connected to the distance image sensor 21. The connection between the object recognition device 100 and the distance image sensor 21 may be implemented by a wired communication channel, a wireless communication channel, or a combination of these. For example, if the object recognition device 100 is in a form of a server that is arranged relatively remote from the distance image sensor 21, the object recognition device 100 may be connected to the distance image sensor 21 via a network. In this case, the network may include, for example, a cellular telephone wireless network, the Internet, the World Wide Web, a VPN (Virtual Private Network), a WAN (Wide Area Network), a wired network, or any combination of these. On the other hand, if the object recognition device 100 is arranged relatively close to the distance image sensor 21, a wireless communication channel may be implemented by near field communication, Bluetooth (Registered trademark), Wi-Fi (Wireless Fidelity), or the like. Also, the object recognition device 100 may be implemented by two or more different devices (e.g., computers, servers, etc.) that interoperate with each other.

Figure 2:
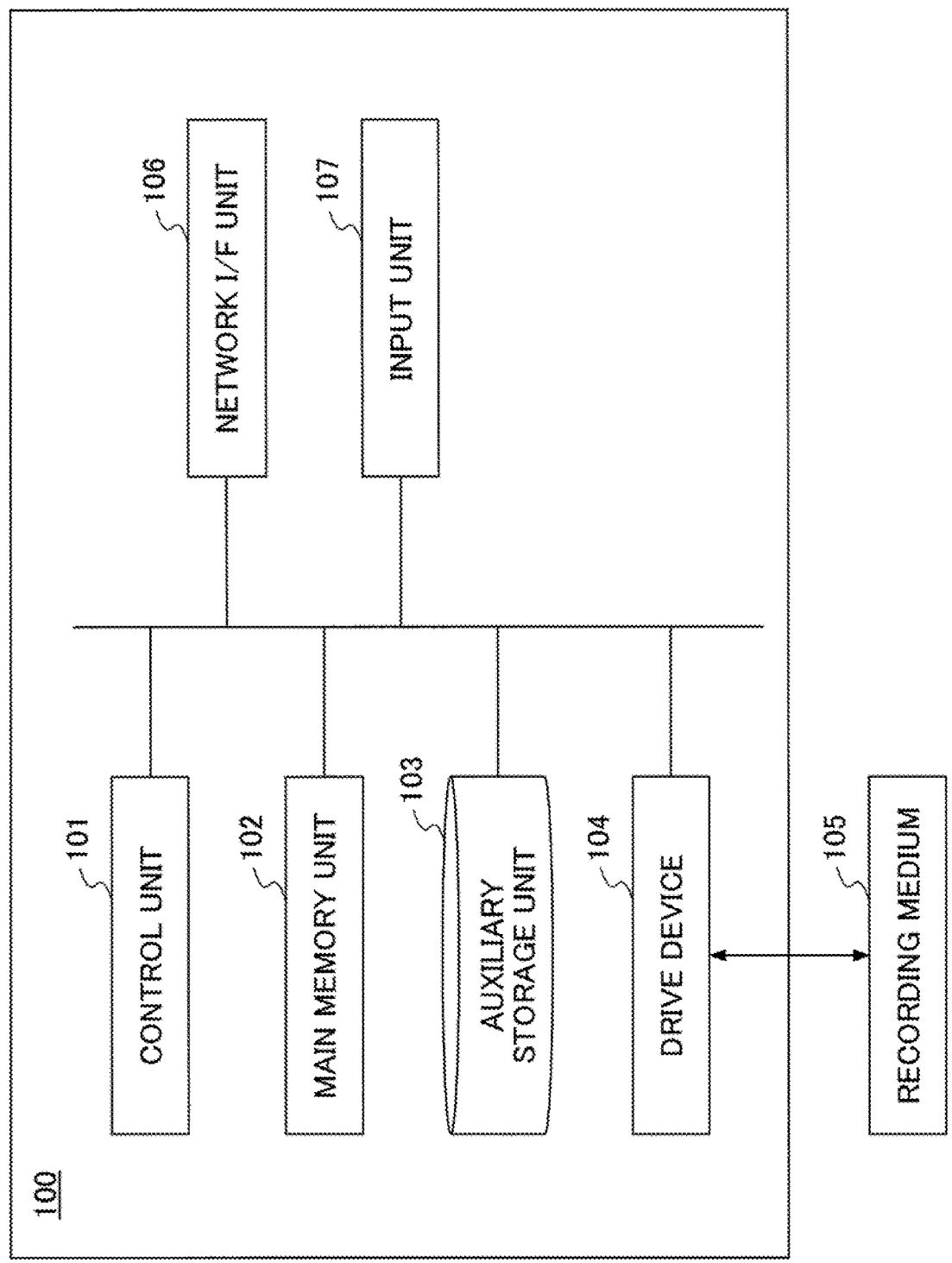
FIG. 2 is a diagram illustrating an example of a hardware configuration of an object recognition device.

FIG. 2 is a diagram illustrating an example of a hardware configuration of the object recognition device 100.

In the example illustrated in FIG. 2, the object recognition device 100 includes a control unit 101, a main memory unit 102, an auxiliary storage unit 103, a drive device 104, a network I/F unit 106, and an input unit 107.

The control unit 101 is an arithmetic/logic device that executes a program stored in the main memory unit 102 or the auxiliary storage unit 103, receives data from the input unit 107 or the storage device, executes arithmetic/logic operations to process the data, and outputs the processed data to the storage device or the like. The control unit 101 may include, for example, a CPU (Central Processing Unit) or a GPU.

The main memory unit 102 includes a read-only memory (ROM) and a random access memory (RAM), and is a storage device for storing or temporarily storing programs or data such as an OS as the basic software or application software executed by the control unit 101.

The auxiliary storage unit 103 is an HDD (hard disk drive) or the like, and is a storage device for storing data related to application software or the like.

The drive device 104 reads a program from a recording medium 105, for example, a flexible disk, and installs the program on the storage device.

The recording medium 105 stores a predetermined program. The program stored in the recording medium 105 is installed in the object recognition device 100 via the drive device 104. The installed predetermined program can be executed by the object recognition device 100.

The network I/F unit 106 is an interface between the object recognition device 100 and a peripheral device having a communication function to be connected to the object recognition device 100 through a network constructed by a data transmission line such as a wired or wireless channel.

The input unit 107 includes a keyboard equipped with cursor keys, numeric keys, and various functional keys; a mouse; a slice pad; and the like. The input unit 107 may be capable of handling other input methods such as input by sounds and/or gestures.

Note that in the example illustrated in FIG. 2, various processes described below can be implemented by causing the object recognition device 100 to execute a program. Also, a program may be recorded on the recording medium 105, and the recording medium 105 on which the program is recorded may be read by the object recognition device 100 to implement the various processes described below. Also, as the recording medium 105, various types of recording media may be used. For example, it may be a recording medium on which information is recorded optically, electrically, or magnetically such as a CD-ROM, flexible disk, magneto-optical disk, or the like; or may be a semiconductor memory on which information is recorded electrically such as a ROM, a flash memory, or the like. Note that the recording medium 105 does not include a carrier wave.

Figure 3:
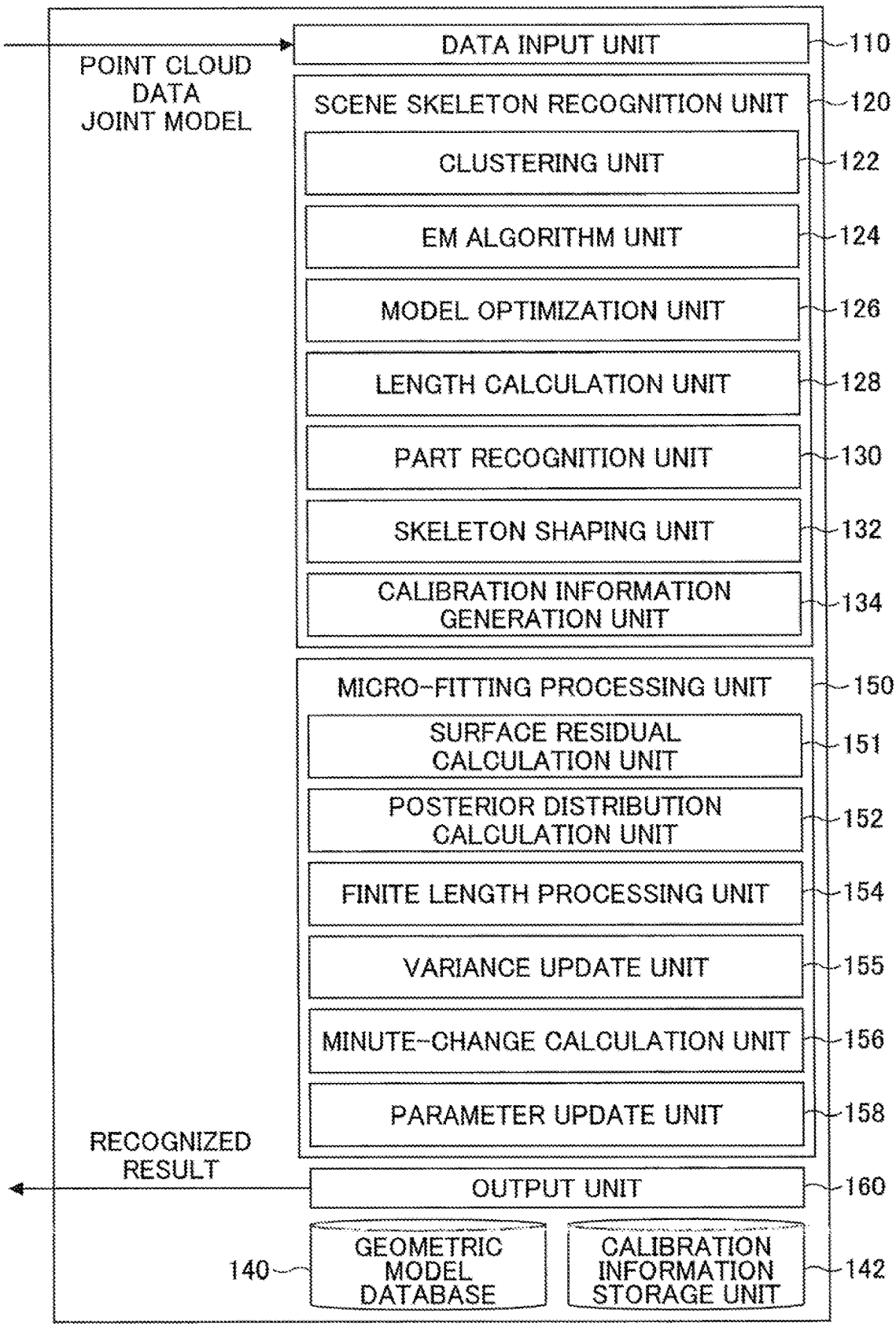
FIG. 3 is a block diagram illustrating an example of functions of an object recognition device.

FIG. 3 is a block diagram illustrating an example of functions of the object recognition device 100.

The object recognition device 100 includes a data input unit 110 (an example of an obtainment unit), a single-scene skeleton recognition unit 120 (an example of a parameter derivation/obtainment unit), and a geometric model database 140 (denoted as a "geometric model DB" in FIG. 3). The object recognition device 100 also includes a calibration information storage unit 142, a micro-fitting processing unit 150 (an example of a derived processing unit), and an output unit 160. The data input unit 110, the single-scene skeleton recognition unit 120, the micro-fitting processing unit 150, and the output unit 160 may be implemented by executing one or more programs stored in the main memory unit 102 by the control unit 101 illustrated in FIG. 2. The geometric model database 140 may be implemented with the auxiliary storage unit 103 illustrated in FIG. 2. Also, the calibration information storage unit 142 may be implemented with the main memory unit 102 (e.g., a RAM) illustrated in FIG. 2. Note that part of the functions of the object recognition device 100 may be implemented by a computer that can be embedded in the distance image sensor 21.

The data input unit 110 receives as input a distance image (referred to as "point cloud data", below) from the distance image sensor 21, and also receives as input a joint model to be used. The point cloud data is as described above and may be input, for example, for each frame cycle. Also, in the case of using multiple distance image sensors 21, the point cloud data may include a set of distance images from multiple distance image sensors 21.

Figure 4:
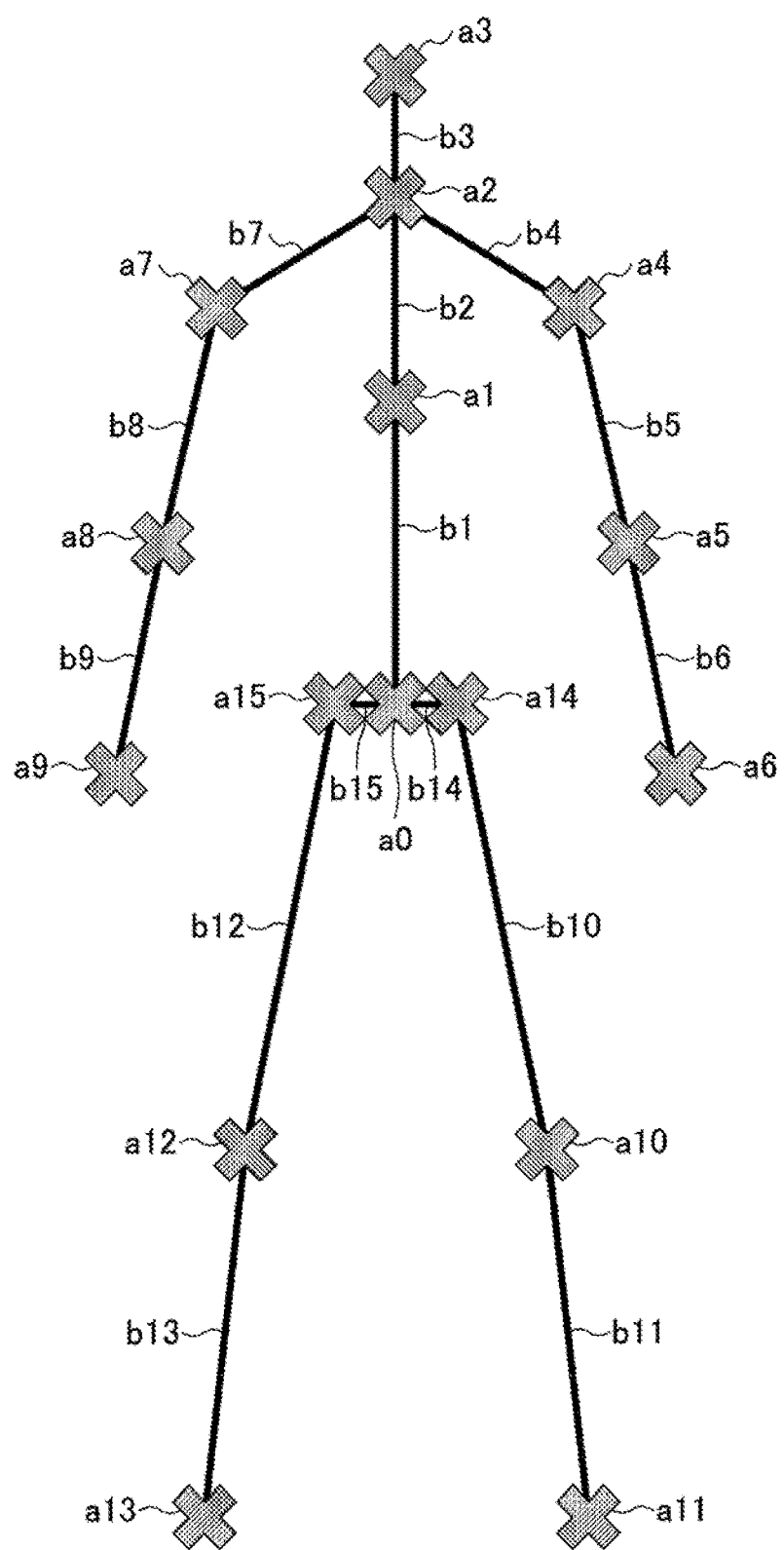
FIG. 4 is a diagram illustrating an example of a joint model.

The joint model to be used is a model related to the subject S, for example, a model that is represented by multiple joints and skeletal parts (links) between joints. In the present embodiment, as an example, a joint model as illustrated in FIG. 4 is used. A joint model as illustrated in FIG. 4 is a 16-joint model in which a head part has one joint; and each of a trunk part (body part), both arm parts, and both leg parts have three joints, where the head part is defined with joints at both ends, and each of the other parts is defined with three joint which are at both ends and at a midpoint. Specifically, the joint model is constituted with 16 joints a0 to a15 and 15 skeletal parts b1 to b15 (also referred to as "parts b1 to b15") connecting the joints. Note that as can be seen, for example, the joints a4 and a7 correspond to the left and right shoulder joints, respectively, and the joint a2 corresponds to the cervical spine joint. Also, the joint a4 and a7 correspond to left and right hip joints, respectively, and the joint a0 corresponds to a lumbar spine joint. In such a joint model, the skeletal parts b14 and b15 pertaining to the hip joints and the skeletal parts b4 and b7 pertaining to the shoulder joints are skeletal parts (also referred to as "hidden skeletal parts", below) that cannot be recognized precisely only by fitting using a geometric model as will be described later. Also, in the following description, when referring to a positional relationship between the joints and parts, an "ancestor" side indicates a side closer to the center of the body, and a "descendant" side indicates a side away from the center of the body.

The single-scene skeleton recognition unit 120 executes a single-scene skeleton recognition process based on point cloud data of the subject S at a certain point in time (single scene). The single-scene skeleton recognition process includes generating calibration information as a result of fitting obtained by fitting a geometric model to the point cloud data of the subject S at a certain point in time (a single scene). The method of fitting using a geometric model will be described later along with the method of generating calibration information. In the following, a point in time at which calibration information is generated by the single-scene skeleton recognition unit 120 will be referred to as a "calibration execution time". The calibration execution time may be a point in time for the first run, or may occur at predetermined intervals, or at a time when a predetermined condition is satisfied.

Once having generated calibration information, the single-scene skeleton recognition unit 120 stores the generated calibration information in the calibration information storage unit 142.

Note that processing in the single-scene skeleton recognition unit 120 poses a processing load significantly higher than in the micro-fitting processing unit 150, which will be described later. Therefore, depending on the processing capability of the object recognition device 100, time to generate calibration information may be longer than the frame cycle. In this case, measures may be taken such that the subject S is requested to remain stationary for a while until the micro-fitting processing unit 150 is ready to start processing (i.e., until generation of the calibration information will be completed).

The micro-fitting processing unit 150 generates skeleton information of the subject S based on point cloud data of the subject S at a point in time (a single scene) after the calibration execution time and the calibration information in the calibration information storage unit 142. The micro-fitting processing unit 150 generates skeleton information of the subject S by a micro-fitting process using a geometric model(s). The method used in the micro-fitting process will be described later. The skeleton information may include information with which the positions of the respective joints a0 to a15 can be identified. The skeleton information may also include information with which the positions, directions, thicknesses of the respective skeletal parts b1 to b15 can be identified. The skeleton information may be used in any application, and may be used to derive skeleton information of the same subject in the next frame cycle. Also, the skeleton information may finally be used to analyze movements of the subject S while performing a sport such as gymnastics. For example, in an analysis of movements of the subject S while performing a sport such as gymnastics, an implementation may include recognition of techniques based on skeleton information. Also, as another application, motions of the subject S who is assumed to be a worker may be analyzed to be used for robot programming. Alternatively, it can be used for a user interface by gestures, identification of individuals, quantifying the skill of a veteran technician.

The output unit 160 outputs the skeleton information of the subject S (denoted as "recognized result" in FIG. 3) to a display device or the like (not illustrated). For example, the output unit 160 may output the skeleton information of the subject S in virtually real time for each frame cycle. In this case, at the calibration execution time, the output unit 160 may output the skeleton information of the subject S based on the calibration information, and at a non-calibration execution time, may output the skeleton information of the subject S from the micro-fitting processing unit 150. Alternatively, when used for explaining movements of the subject S, the output unit 160 may output the skeleton information in chronological order not necessarily in real time.

According to the present embodiment, as described above, based on a fitting result (calibration information) using a geometric model(s) by the single-scene skeleton recognition unit 120, the micro-fitting processing unit 150 executes a micro-fitting process, and thereby, it is possible to generate the skeleton information of the subject S. This reduces the computational load compared to the case where the single-scene skeleton recognition unit 120 executes fitting by using the geometric models for each frame; therefore, the joints or skeleton of the object can be precisely recognized with a relatively lower computational load. This enables to analyze fast and complex movements as seen in gymnastics, figure skating, and the like.

In the following, the single-scene skeleton recognition unit 120 and the micro-fitting processing unit 150 will be described in this order.

[Single-Scene Skeleton Recognition Unit]

The single-scene skeleton recognition unit 120 includes a clustering unit 122, an EM algorithm unit 124, a model optimization unit 126, and a length calculation unit 128. Also, the object recognition device 100 further includes a part recognition unit 130, a skeleton shaping unit 132, and a calibration information generation unit 134.

The clustering unit 122 clusters point cloud data that has been input into the data input unit 110 and executes fitting for each cluster to obtain an initial fitting result (initial values used for fitting using a geometric model(s), which will be described later). As the clustering method, K-means++ or the like may be used. Note that the number of clusters given to the clustering unit 122 may be input manually; or instead, a predetermined number depending on the skeleton model may be used. The predetermined number depending on the skeleton model is, for example, a number obtained by subtracting the number of hidden skeletal parts from the total number of parts of the skeleton model. In other words, in the case of the 16-joint (15-part) model illustrated in FIG. 4, the predetermined number defined for the initial clusters is "11" because there are four hidden skeletal parts. In this case, depending on a result of fitting by clustering, one or more parts of the model are discarded. As a discarding method, a method may be used in which a threshold is set for the sum of posterior distributions for data items, which may be regarded as an expected value of the number of point cloud data items that can be explained by the model, to discard a part of the model with which the sum is less than or equal to the threshold. Once the number of parts to be discarded has been determined, the clustering unit 122 can execute fitting again with the number of clusters to obtain initial values used for fitting using the geometric model, which will be described later.

Note that in a modified example, instead of the clustering unit 122, a machine learning unit may be used for obtaining initial values used for fitting. In this case, the machine learning unit executes labeling (part recognition) for 15 parts based on point cloud data input into the data input unit 110. Random forests may be used as the machine learning method, to use difference in the distance value between a target pixel and a peripheral pixel as the feature quantity. Also, a method may be adopted in which multi-class classification of pixels is executed, taking a distance image as input. Also, in the case of using random forests, a feature quantity other than the difference in the distance value may be used, or deep learning may be used in which learning is also executed on parameters corresponding to the feature quantities.

The EM algorithm unit 124 derives parameters $\theta$ by an EM algorithm based on point cloud data input into the data input unit 110, a geometric model(s) in the geometric model database 140, and initial values of fitting obtained by the clustering unit 122. The initial values of the fitting obtained in the clustering unit 122 are used because it is useful in an EM algorithm to give initial values close to a solution to a certain extent. The initial values include the number of parts M and initial values of parameters $\theta$, which will be described later. A geometric model in the geometric model database 140 is, for example, a cylinder, and in the following, cases in which the model is primarily a cylinder will be described. Other possible geometric models will be described later.

The EM algorithm unit 124 determines the parameters $\theta$ so that items of point cloud data $x_n$ are densest on the surface of a geometric model. The point cloud data $x_n$ forms a set $(x_1, x_2, \ldots, x_n)$ of N points (e.g., position vectors) each represented by three-dimensional spatial coordinates (x, y, z). In this case, for example, the x and y components of the spatial coordinates are two-dimensional coordinate values in an image plane, where the x component is the horizontal component and the y component is the vertical component. Also, the z component represents a distance.

The parameters $\theta$ includes four parameters, which are the thickness (diameter) $r_m$ of a geometric model (here, a cylinder) of a part m (m=1, 2, . . . , M'), the position $c_m^0$ and the direction $e_m^0$ of the geometric model of the part m, and the variance $\sigma^2$. Note that a part m corresponds to a part of point cloud data to be fit to a geometric model, which is associated with the geometric model and also associated with a part of the subject S. A part m may be associated with two parts of the subject S at the same time. For example, in a state of the subject S extending an elbow, a part from the elbow joint to the wrist joint (descendant side joint) (part b6 or part b9 in FIG. 4) and a part from the elbow joint to the shoulder joint (ancestor side joint) (part b5 or part b8 in FIG. 4) may constitute a single part m.

Here, $r_m$ and $\sigma^2$ are scalars and $c_m^0$ and $e_m^0$ are vectors. Also, assume that $e_m^0$ is a unit vector. In other words, $e_m^0$ is a unit vector representing the direction of the axis of a cylinder. Also, the position $c_m^0$ is a position vector representing the position at any point along the axis of the cylinder. Note that the length (height) in the axial direction of the cylinder is set undefined. Also, the direction $e_m^0$ of a geometric model is conceptually the same as the axial direction of the geometric model.

Assuming that a surface residual $\varepsilon_m(x_n, \theta)$ between point cloud data $x_n$ and each part m (difference in the direction perpendicular to the surface) follows a Gaussian distribution, the geometric models as a whole can be expressed as follows:

$$p(x_n) = \frac{1}{M'(2\pi\sigma^2)^{1/2}} \sum_{m=1}^{M'} \exp\left(-\frac{\varepsilon_m(x_n, \theta)^2}{2\sigma^2}\right) \quad \text{[Formula 1]}$$

where $p(x_n)$ represents a mixture model of probability distributions of the point cloud data $x_n$, $\sigma^2$ represents the variance, and M' represents the number of clusters obtained by the clustering unit 122 as described above. At this time, the corresponding log-likelihood function is expressed as follows:

$$E(\theta, \sigma^2) = N \ln M'(2\pi\sigma^2)^{1/2} - \sum_{n=1}^{N} \ln \sum_{m=1}^{M'} \exp\left(-\frac{\varepsilon_m(x_n, \theta)^2}{2\sigma^2}\right) \quad \text{[Formula 2]}$$

where N represents the number of data items (the number of data items included in point cloud data for a single frame).

Formula 2 is a log-likelihood function of a Gaussian mixture model; therefore, an EM algorithm or the like can be used. In the present embodiment, the EM algorithm unit 124 derives parameters $\theta$ and variance $\sigma^2$ that maximize the log-likelihood function based on an EM algorithm.

In the case where the geometric model of a part m is a cylinder, the surface residual $\varepsilon_m(x_n, \theta)$ can be expressed as follows, where an operator "x" between vectors represents a cross product.

$$\varepsilon_m(x_n, \theta) = |(x_n - e_m^0) \times e_m^0| - r_m$$

However, in the present embodiment, the surface residual $\varepsilon_m(x_n, \theta)$ is expressed such that the exponent part in Formula 2 is represented as a difference of the squares for linearization, specifically as follows:

$$\varepsilon_m(x_n, \theta) = \frac{|(x_n - c_m^0) \times e_m^0|^2 - r_m^2}{\sigma} \quad \text{[Formula 3]}$$

As has been well-known, an EM algorithm repeats an E step of calculating an expected value and an M step of maximizing the expected value.

In the E step, the EM algorithm unit 124 calculates a posterior distribution $p_{nm}$ as follows.

$$p_{nm} = \frac{\exp(-\varepsilon_m(x_n, \theta)^2/2\sigma^2)}{\sum_{m=1}^{M'} \exp(-\varepsilon_m(x_n, \theta)^2/2\sigma^2)} \quad \text{[Formula 4]}$$

In the M step, the EM algorithm unit 124 derives parameters $\theta$ and variance $\sigma^2$ that maximize the following expected value $Q(\theta, \sigma^2)$. Note that in the M step, the posterior distribution $p_{nm}$ is treated as a constant.

$$Q(\theta, \sigma^2) = \frac{1}{2\sigma^2}\sum_{n=1}^{N}\sum_{m=1}^{M'} p_{nm}\varepsilon_m(x_n, \theta)^2 + \frac{P}{2}\ln\sigma^2 \quad \text{[Formula 5]}$$

where P represents a double summation of posterior distributions $p_{nm}$ over data items and over all parts (also referred to as the "sum of posterior distributions $p_{nm}$ over data items and all parts"), which is expressed as follows:

$$P = \Sigma_{n=1}^{N}\Sigma_{m=1}^{M'} p_{nm} \quad \text{[Formula 6]}$$

An estimated value $\sigma^{2*}$ of the variance $\sigma^2$ that maximizes the expected value $Q(\theta, \sigma^2)$ obtained from partial differential of the expected value $Q(\theta, \sigma^2)$ with respect to the variance $\sigma^2$ is as follows:

$$\sigma_*^2 = \frac{1}{P}\sum_{n=1}^{N}\sum_{m=1}^{M'} p_{nm}\varepsilon_m(x_n, \theta)^2 \quad \text{[Formula 7]}$$

By substituting this estimated value $\sigma^{2*}$ into Formula 5, the following formula is obtained.

$$Q(\theta, \sigma^2) = \frac{P}{2}\left\{1 - \ln P + \ln\sum_{n=1}^{N}\sum_{m=1}^{M'} p_{nm}\varepsilon_m(x_n, \theta)^2\right\} \quad \text{[Formula 8]}$$

Among the elements ($r_m$, $c_m^0$, and $e_m^0$) constituting the parameters $\theta$, an estimated value $r_{*m}$ of the thickness $r_m$ can be directly minimized as follows:

$$r_{*m}^2 = \langle |(x_n - c_m^0) \times e_m^0|^2 \rangle_p \quad \text{[Formula 9]}$$

where a notation $\langle \rangle_p$ in Formula 9 is an averaging operation using the posterior distribution $p_{nm}$, and defined as follows for any tensor or matrix $A_{nm}$.

$$\langle A_{nm} \rangle_p \equiv \frac{1}{\sum_{n=1}^{N} p_{nm}}\sum_{n=1}^{N} p_{nm} A_{nm} \quad \text{[Formula 10]}$$

An estimated value $e_{*m}^0$ of the direction $e_m^0$ can be derived based on principal component analysis, focusing on the principal component of the point cloud data. In other words, an estimated value $e^*_m{}^0$ of the direction $e_m^0$ can be obtained as the direction of an eigenvector having the greatest eigenvalue of the following variance-covariance matrix $\sigma_{xx}$.

$$\sigma_{xx} = \langle (x_n - \langle x_n \rangle_p)(x_n - \langle x_n \rangle_p)^T \rangle_p \quad \text{[Formula 11]}$$

Note that summation is not calculated over m in accordance with the averaging operation expressed in Formula 10. Therefore, $\langle x_n \rangle_p$ has a dependency on a part m and corresponds to the center of gravity (center) of the geometric model (cylinder) related to the part m. Similarly, the variance-covariance matrix $\sigma_{xx}$ is also specific to the part m and corresponds to the direction of the geometric model (cylinder) related to the part m. Alternatively, considering that the expected value $Q(\theta, \sigma^2)$ is nonlinear with respect to the elements ($r_m$, $c_m^0$, and $e_m^0$) of the parameters $\theta$, the direction $e_m^0$ may be derived by linear approximation. Specifically, an updating formula by minute rotation is defined in an aspect where the norm is preserved, which is as follows:

$$e_m^0 \rightarrow e_m^0 + \Delta e \times e_m^0 \quad \text{[Formula 12]}$$

where $\Delta e$ represents a minute-rotation vector. At this time, an estimated value $\Delta e^*$ of $\Delta e$ is obtained by differentiating Formula 8 with respect to $\Delta e$, which is as follows:

$$\Delta e_* = -\frac{1}{2}B_m^{-1}\langle a_{nm} b_{nm} \rangle_p \quad \text{[Formula 13]}$$

where the inverse matrix of $B_m$ is as follows:

$$B_1^{-1} = (We_m^{0T})\langle (x_n - \langle x_n \rangle_p)(x_n - \langle x_n \rangle_p)(x_n - \langle x_n \rangle_p)^T (x_n - \langle x_n \rangle_p)^T \rangle_p^{-1}(We_m^{0T})^T \quad \text{[Formula 14]}$$

where W in Formula 14 is as follows:

$$W \equiv (e_2 e_1^T - e_1 e_2^T) \quad \text{[Formula 15]}$$

Note that in Formula 14 and Formula 15 (and similarly in the formulas below), $^T$ represents the transpose. In Formula 15, $e_1$ and $e_2$ are unit vectors orthogonal to the direction $e_m^0$. Also, $a_{nm}$ and $b_{nm}$ in Formula 13 are as follows (these notations are different from the joints a0 to a15 and the skeletal parts b1 to b15 illustrated in FIG. 4).

$$a_{nm} \equiv |(x_n - \langle x_n \rangle_p) \times e_m^0|^2 - r_m^2 \quad \text{[Formula 16]}$$

$$b_{nm} \equiv (x_n - \langle x_n \rangle_p) \cdot e_m^0 (x_n - \langle x_n \rangle_p) \times e_m^0 \quad \text{[Formula 17]}$$

Therefore, an estimated value $e_{*m}^0$ of the direction $e_m^0$ is as follows:

$$e_{*m}^0 = e_m^0 - \frac{1}{2}(B_1^{-1}\langle a_{nm} b_{nm} \rangle_p) \times e_m^0 \quad \text{[Formula 18]}$$

At this time, by substituting the estimated value $r_{*m}$ of the thickness $r_m$ into Formula 8, and partially differentiating with respect to the position $c_m^0$, an estimated value $c_{*m}^0$ of the position $c_m^0$ can be directly derived as follows:

$$c_{*m}^0 \times e_{*m}^0 = \sigma_{yy}^{-1} \sigma_{y^2y}/2 \quad \text{[Formula 19]}$$

where the inverse matrix of a covariance matrix $\sigma_{yy}$ and a vector $\sigma_{y^2y}$ ("y²y" subscripted) are as follows:

$$\sigma_{yy}^{-1} = W\sigma_{xx}^{-1}W^T, \sigma_{xx} = \langle (x_n - \langle x_n \rangle_p)(x_n - \langle x_n \rangle_p)^T \rangle_p \quad \text{[Formula 20]}$$

$$\sigma_{y^2y} \equiv \langle (|x_n \times e_{*m}^0|^2 - \langle |x_n \times e_{*m}^0|^2, \rangle_p)(x_n \times e_{*m}^0 - \langle x_n \times e_{*m}^0 \rangle_p) \rangle_p \quad \text{[Formula 21]}$$

Note that in the above case, the EM algorithm unit 124 first determines an estimated value $c_{*m}^0$ of the position $c_m^0$, and then, determines an estimated value $r_{*m}$ of the thickness $r_m$.

Note that in a modified example, for example, in the case where the shape information of the subject S is available by another measurement, the thickness $r_m$ among the parameters $\theta$ may be manually input by the user or set automatically based on the shape information. In this case, the EM algorithm unit 124 derives the remaining elements among the parameters $\theta$ (the position $c_m^0$ and the direction $e_m^0$. Also, the other measurement may be a precise measurement executed in advance or may be a measurement executed in parallel.

When the EM algorithm unit 124 executes fitting by using multiple types of geometric models for one part, the model optimization unit 126 derives a type of geometric model that exhibits the best fitting from among the multiple types of geometric models.

The multiple types of geometric models include as geometric models other than a cylinder, at least one of a cone, a trapezoidal cylinder, an elliptical cylinder, an elliptical cone, and a trapezoidal elliptical cylinder. However, multiple types of geometric models for a part may not include a cylinder. Also, multiple types of geometric models to be fit may differ from part to part. Also, for some specific parts, multiple types of geometric models may not be used, and a single fixed geometric model may be used.

For example, the EM algorithm unit 124 first executes fitting for each part by using a geometric model of a cylinder. Next, the EM algorithm unit 124 switches the geometric model for the part from the cylinder to another (e.g., a cone, etc.) to execute fitting for the part. Then, the model optimization unit 126 selects a geometric model that brings a greatest value of the log-likelihood function as the best-fit geometric model. Instead of the geometric model that brings the greatest value of the log-likelihood function, the model optimization unit 126 may select a geometric model with which the sum of posterior distributions over data items and all parts becomes greatest as the best-fit geometric model.

In the case of a cone, the surface residual $\varepsilon_m(x_n, \theta)$ may be expressed as follows:

$$\varepsilon_m(x_n,\theta)=|(x_n-c_m^0)-e_m^0\|n_m \times e_m^0|-(x_n-c_m^0)\cdot e_m^0 n_m \cdot e_m^0 \quad \text{[Formula 22]}$$

where the position $c_m^0$ corresponds to the vertex position, and the direction $e_m^0$ is a unit vector along the central axis. Also, the vector $n_m$ is a normal vector at a point on the surface of the cone.

In the case of a trapezoidal cylinder, the surface residual $\varepsilon_m(x_n, \theta)$ may be similar to the case of a cone. In other words, in the case of a trapezoidal cylinder, the surface residual $\varepsilon_m(x_n, \theta)$ may be expressed by defining a distribution for a part of the cone.

For an elliptical cylinder, the surface residual $\varepsilon_m(x_n, \theta)$ may be expressed as follows:

$$\varepsilon_m(x_n, \theta) = \frac{|(x_n - c_m^0) \times e_m^0 - d_m n'_m| + }{\left\| \frac{(x_n - c_m^0) \times}{e_m^0 - d_m n'_m} \right\| + \left\| \frac{(x_n - c_m^0) \times}{e_m^0 + d_m n'_m} \right\|} \quad \text{[Formula 23]}$$

where $d_m$ represents the focal length, $a_m$ represents the length of the long axis of the ellipse as the cross-section, and $n_m^0$ represents a unit vector in the long axis direction. Note that similarly, the position $c_m^0$ corresponds to a position along the axis direction, and the direction $e_m^0$ represents a unit vector along the axis (in the axial direction) of the elliptical cylinder.

Also, in the case of an elliptical cone, the surface residual $\varepsilon_m(x_n, \theta)$ may be expressed as follows:

$$\varepsilon_m^2(x_n, \theta) = |x_n - c_m^0|^2 - \frac{\left\{(x_n - c_m^0)\cdot e_m^0 \cos\psi_{m1} + |(x_n - c_m^0) \times e_m^0|\sqrt{\sin^2\psi_{m1} - (\sin^2\psi_{m1} - \cos^2\psi_{m1}\tan^2\psi_{m2})\left(\frac{(x_n - c_m^0) \times e_m^0}{|(x_n - c_m^0) \times e_m^0|}\cdot n'_m\right)^2}\right\}^2}{1 - (\sin^2\psi_{m1} - \cos^2\psi_{m1}\tan^2\psi_{m2})\left(\frac{(x_n - c_m^0) \times e_m^0}{|(x_n - c_m^0) \times e_m^0|}\cdot n'_m\right)^2} \quad \text{[Formula 24]}$$

where $\psi_{m1}$ and $\psi_{m2}$ are tilt angles in the directions of the long and short axes, respectively. Also, similarly, the position $c_m^0$ corresponds to the vertex position, and the direction $e_m^0$ is a unit vector along the central axis.

Also, similar to the relationship between a trapezoidal cylinder and a cone, in the case of a trapezoidal elliptical cylinder, the surface residual $\varepsilon_m(x_n, \theta)$ may be similar to the case of an elliptical cone.

Here, in the case of using a geometric model such as a cylinder or elliptical cylinder in which the length is formulated as infinity, in the E step, the EM algorithm unit 124 favorably executes a finite length process. The finite length process is a process of calculating the posterior distribution $p_{nm}$ only for data items that satisfy a predetermined condition among items of the point cloud data $x_n$, and setting the posterior distribution $p_{nm}$ to 0 for the other data items. The finite length process is a process for preventing data items irrelevant to a part m from being mixed; therefore, the predetermined condition is set so that data items irrelevant to the part m can be excluded. This enables to prevent the effect of point cloud data items that are not actually relevant from affecting the analysis. The data item satisfying the predetermined conditions may be, for example, a data item satisfying the following formula.

$$\{(x_n - \langle x_n \rangle_p)\cdot e_m^0\}^2 < (\alpha l_m^0)^2 \quad \text{[Formula 25]}$$

where $l_m^0$ represents a length that is input with respect to a part m, and $\alpha$ represents a margin (e.g., 1.2). According to Formula 25, the posterior distribution is set to 0 for a data item having the distance in the axial direction from the center (or the center position, the same below) of the geometric model greater than or equal to a predetermined distance ($=\alpha l_m^0$) in the set of point cloud data. The length $l_m^0$ to be input may be entered manually or may be set based on the shape information of the subject S obtained by another measurement.

In the case where the EM algorithm unit 124 uses a geometric model such as a cylinder or elliptical cylinder in which the length is formulated as infinity, the length calculation unit 128 derives a length parameter $l_m$ corresponding to the length from the center to the end of the geometric model (the length from the center to the end of a part m). For example, the length calculation unit 128 may calculate the length parameter $l_m$ of a part m by using the variance-covariance matrix $\sigma_{xx}$ as follows:

$$l_m = C e_m^{0T} \sigma_{xx} e_m^0 \quad \text{[Formula 26]}$$

where C represents a constant multiple for correction.

Alternatively, the length calculation unit 128 may derive the length parameter $l_m$ of the part m based on the form of distribution of point cloud data items along the axial direction of the part m. Specifically, the length calculation unit 128 may calculate the length parameter $l_m$ of the part m by determination based on the full width at half maximum. The full width at half maximum represents an interval such that at end points of the interval, the number of data items becomes half compared to a point at which the number of data items is the greatest. The length calculation unit 128 derives the length parameter by finding a "break" in the part m. In other words, the length calculation unit 128 slices the part m into small rings along the axial direction such that each ring has the axial direction represented by the direction $e_m^0$ as the normal; counts the number of data items included therein; and specifies a slice at which the number of data items is less than or equal to a predetermined threshold value as a "break". Specifically, in the case of making determination based on the full width at half maximum, the predetermined threshold value may be half the maximum value of the count value; alternatively, it may be a value other than half, such as 0.1 times the maximum value of the count value.

Here, with reference to FIGS. 5 and 6, an example of a method of determining the full width at half maximum by the length calculation unit 128 will be described in detail.

Figure 5:
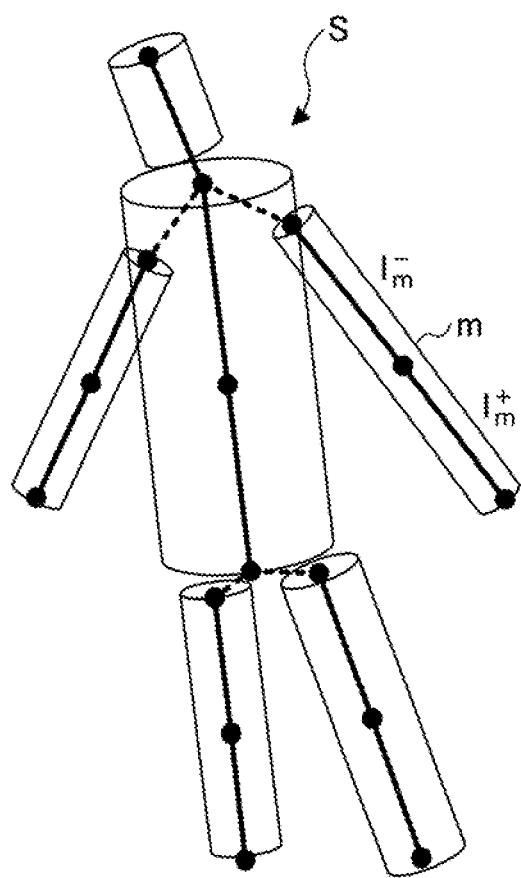
FIG. 5 is a diagram schematically illustrating a result derived by an EM algorithm unit 124.
Figure 6:
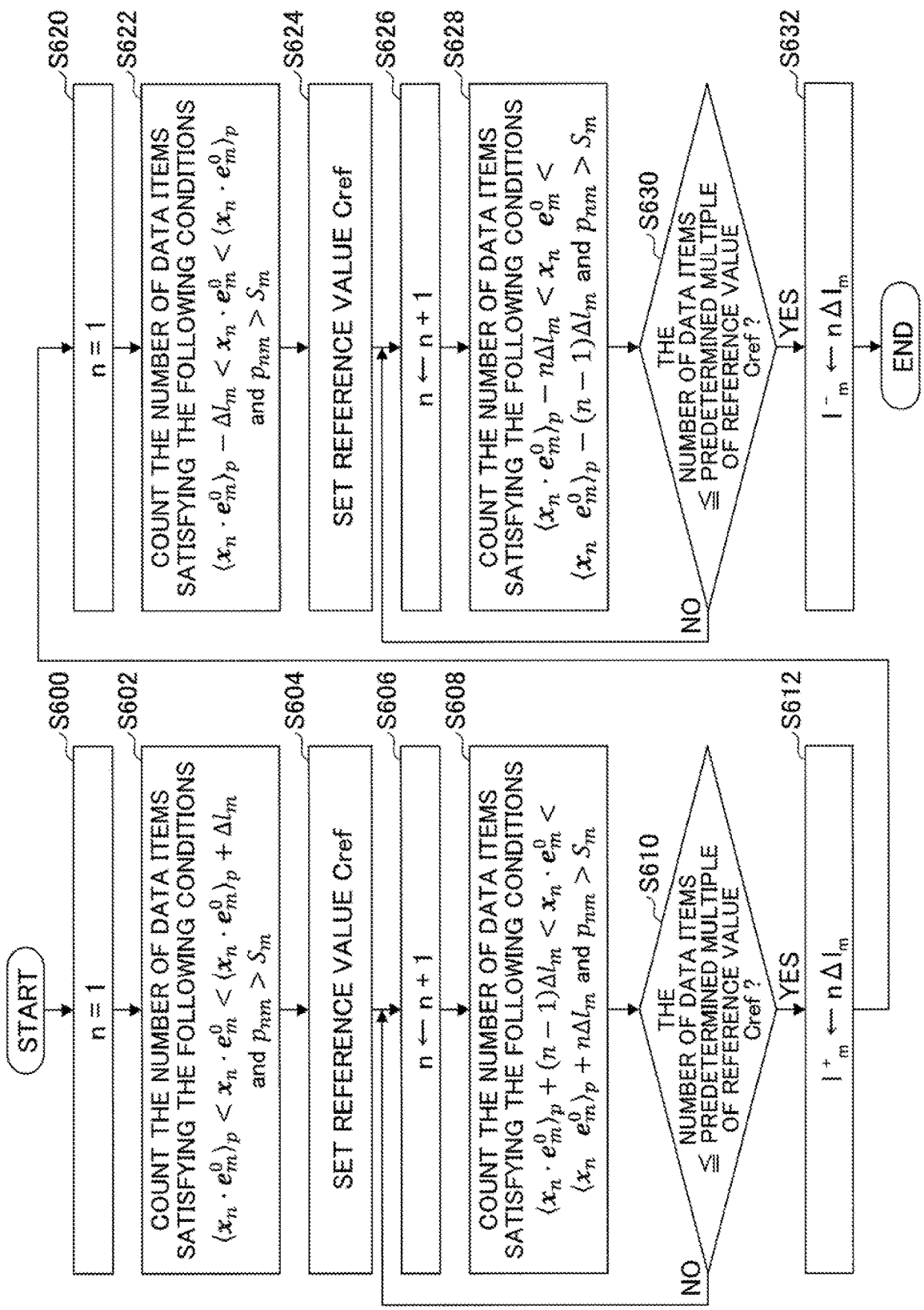
FIG. 6 is a schematic flow chart for describing a method of determination based on the full width at half maximum by a length calculation unit 128.

FIG. 5 is a schematic diagram illustrating a derived result by the EM algorithm unit 124 (a result of fitting by a geometric model), and FIG. 6 is a schematic flow chart for describing a method of determination based on the full width at half maximum by the length calculation unit 128.

In FIG. 5, each of the head and trunk parts is fit with a single cylinder, and each of the arm and leg parts is fit with a single cylinder. With reference to FIG. 5, a method of calculating a length parameter(s) $l_m$ (or $l^+_m$ and $l^-_m$) of a part m will be described in the case where an arm part of the subject S is the part m. Note that as illustrated in FIG. 5, the arm part is recognized as a single part (fit in a single geometric model) by the EM algorithm unit 124 because the elbow joint is extended.

At Step S600, the length calculation unit 128 sets n=1. The meaning of n will be described later.

At Step S602, the length calculation unit 128 counts the number of data items that satisfy the following conditions among the items of point cloud data $x_n$.

$$\langle x_n \cdot e_m^0 \rangle_p < x_n \cdot e_m^0 < \langle x_n \cdot e_m^0 \rangle_p + \Delta l_m \text{ and } p_{nm} > S_m \quad \text{[Formula 27]}$$

where $\langle x_n \cdot e_m^0 \rangle_p$ corresponds to the center of the part m, and $\Delta l_m$ corresponds to the width of the sliced rings (width along the axis direction $e_m^0$), which is, for example, $0.011_m^0$. Note that as described above, $l_m^0$ represents the length input with respect to the part m. Sm represents a threshold value for the posterior distribution $p_{nm}$, for example, 0.1.

At Step S604, the length calculation unit 128 sets a reference value Cref based on the count obtained at Step S602. For example, the length calculation unit 128 sets the count obtained at Step S602 as the reference value Cref.

At Step S606, the length calculation unit 128 increments n by only "1".

At Step S608, the length calculation unit 128 counts the number of data items that satisfy the following conditions among the items of point cloud data $x_n$. In other words, the length calculation unit 128 counts the number of data items that satisfy the following conditions in the next interval shifted by only $\Delta l_m$.

$$\langle x_n e_m^0 \rangle_p + (n-1)\Delta l_m < x_n \cdot e_m^0 < \langle x_n \cdot e_m^0 \rangle_p + n\Delta l_m \text{ and } p_{nm} > S_m \quad \text{[Formula 28]}$$

At Step S610, the length calculation unit 128 determines whether or not the number of data items counted at Step S608 is less than or equal to a predetermined constant multiple of (e.g., 0.5 times) the reference value Cref. If the determination result is "YES," the process proceeds to Step S612; or otherwise, the process is repeated from Step S606.

At Step S612, the length calculation unit 128 calculates a length parameter $l^+_m$ from the center to the end on the descendant side of the part m as $n\Delta l_m$ by using the current value of n, namely, calculates $l^+_m = n\Delta l_m$.

At Step S620 to Step S632, the length calculation unit 128 proceeds in the reverse direction (the ancestor side), to similarly calculate a length parameter $l^-_m$ from the center to the end on the ancestor side of the part m illustrated in FIG. 5.

Note that as a modified example, the length calculation unit 128 may calculate the length parameter $l_m$ of the part m as follows:

$$l_m \equiv \min_{n \in N_m} |x_n \cdot e_m^0 - \langle x_n \cdot e_m^0 \rangle_p| \quad \text{[Formula 29]}$$

where $N_m$ represents a subset of n defined as follows, namely, a set of n in which the posterior distribution $p_{nm}$ for n is smaller than a threshold value $p_m^{th}$.

$$n_m \equiv \{n | p_{nm} < p_m^{th}\} \quad \text{[Formula 30]}$$

The threshold $p_m^{th}$ is defined, for example, as follows:

$$p_m^{th} = \frac{1}{2} \max_n p_{nm} \quad \text{[Formula 31]}$$

Defined as such, the subset $N_m$ represents a set of data items not belonging to the part m among the point cloud data $x_n$. Therefore, the length calculation unit 128 calculates the length parameter $l_m$ of the part m based on a data item with which the distance from the center ($|x_n \cdot e_m^0 - \langle x_n \cdot e_m^0 \rangle_p|$ in Formula 29) is the minimum in the subset $N_m$.

The part recognition unit 130 executes a part recognition process based on the derived result of the parameters ($r_m$, $c_m^0$, and $e_m^0$) of the part m and the derived result of the length parameter $l_m$ of the part m. The part recognition process includes recognition of a correspondence relationship between the part m and the other parts of the subject S (see the parts b1 to b15 in FIG. 4).

Here, according to the derived result of the length parameter $l_m$ of the part m and the derived result of $c_m^0$ and $e_m^0$, the position of the end on the axis of the part m (the end defining the length parameter $l_m$) can be derived based on the length parameters $l^+_m$ and $l^-_m$ from the center of the part m ($=\langle x_n \cdot e_m^0 \rangle_p$). Specifically, the position ξm0 at the end of the part m on the axis satisfies the following formula.

$$\xi_m^0 = e_m^0 \times (c_m^0 \times e_m^0) + (\xi_m^0 \cdot e_m^0) e_m^0 \quad \text{[Formula 32]}$$

where the second term on the right side in Formula 32 is expressed as follows for the end on the ancestor side and for the end on the descendant side.

$$\xi_m^0 \cdot e_m^0 = \quad \text{[Formula 33]}$$
$$\begin{cases} \beta \langle x_n \cdot e_m^0 \rangle_p - l_m^- & \text{end on ancestor side (joint point)} \\ \beta \langle x_n \cdot e_m^0 \rangle_p + l_m^+ & \text{end on descendant side (joint point)} \end{cases}$$

where $l^+_m$ is the length parameter from the center of the part m ($=\langle x_n \cdot e_m^0 \rangle_p$) to the descendant side as described above, and $l^-_m$ is the length parameter from the center of the part m to the ancestor side, which are calculated by the length calculation unit 128 as described above. Also, β is a constant and may be, for example, 1.

In the following description, a "joint point" refers to a representative point related to a joint (a point representing a position related to the joint), and an end (a position) of a part m that can be derived in this way corresponds to a joint point. Also, in the following description, a part m* (* is an optional symbol) represents a particular part among parts m (m=1, 2, . . . , M') for which the parameters ($r_m$, $c_m^0$, and $e_m^0$) have been obtained. The part recognition unit 130 uses the thickness $r_m$ to identify a main part. The main part is a part having a largest thickness, and in the present embodiment, the main part is the trunk part of the subject S.

The part recognition unit 130 recognizes, as the main part of the object, the thickest part, or the first and second thickest parts such that the two parts are adjacent to each other and have the thickness difference less than a predetermined value. Specifically, if the difference between a first largest part m1 and a second largest part m2 is less than a predetermined value, the part recognition unit 130 identifies both parts m1 and m2 as the trunk part. The predetermined value is an adaptive value that corresponds to the difference in the thickness between the part m1 and m2. On the other hand, if the difference between the first largest part m1 and the second largest part m2 is greater than or equal to the predetermined value, the part recognition unit 130 identifies only the first largest part m1 as the trunk part (part b1+part b2). In this case, the part recognition unit 130 sets a "cutting flag" to the part m1. The meaning of the cutting flag will be described later. This enables, for example, in FIG. 4, depending on the pose of the subject S, even when the part b1 and the part b2 extend straight, to recognize the part b1 and the part b2 as the trunk part related to the part m1 and the part m2.

Once having identified the main part (the trunk part), the part recognition unit 130 determines (identifies) joint points near the bottom surface of the trunk part. With respect to the bottom surface of the trunk part, the part recognition unit 130 identifies two parts ml and mr to which the position of the end of the trunk part belongs within a small cylinder (or elliptical cylinder, trapezoidal cylinder, etc.) set at the position of the bottom end of the trunk part. Note that a predetermined value may be used as the height of the small cylinder. Then, the part recognition unit 130 recognizes the parts ml and mr as a part related to the left leg part (part b10 or parts b10+b11 in FIG. 4) and a part related to the right leg part (part b12 or part b12+b13 in FIG. 4).

Once having identified the part ml related to the left leg part, the part recognition unit 130 determines whether or not there is a part having a position at the end close to the trunk part within a sphere (also referred to as a "coupling sphere", below) set at a position at the end far from the trunk part in the part ml. Note that a predetermined value may be used for the diameter of the coupling sphere. Then, if there is a part ml2 having a position at the end close to the trunk part in the coupling sphere, the part recognition unit 130 recognizes the part ml as the thigh b10 of the left leg part and recognizes the part ml2 as the shin b11 of the left leg part. On the other hand, if there is no part having a position at the end close to the trunk part in the coupling sphere, the part recognition unit 130 recognizes the part ml as a part that includes both the thigh and shin of the left leg part. In this case, the part recognition unit 130 sets a "cutting flag" to the part ml. This enables, for example, in FIG. 4, even when the parts b10 and b11 extend straight depending on the pose of the subject S, to recognize the parts b10 and b11 as a part of the left leg part.

Similarly, once having identified the part mr related to the right leg part, the part recognition unit 130 determines whether or not there is a part having a position at the end close to the trunk part within a sphere (coupling sphere) set at a position at the end far from the trunk part in the part mr. Note that a predetermined value may be used for the diameter of the coupling sphere. Then, if there is a part mr2 having a position at the end close to the trunk part in the coupling sphere, the part recognition unit 130 recognizes the part mr as the thigh b12 of the right leg part and recognizes the part mr2 as the shin b13 of the right leg part. On the other hand, if there is no part having a position at the end close to the trunk part in the coupling sphere, the part recognition unit 130 recognizes the part mr as a part that includes both the thigh and shin of the right leg part. In this case, the part recognition unit 130 sets a "cutting flag" to the part mr. This enables, for example, in FIG. 4, even when the parts b12 and b13 extend straight depending on the pose of the subject S, to recognize the parts b12 and b13 as a part of the right leg part.

Also, once having identified the main part (trunk part), the part recognition unit 130 determines (identifies) joint points near the sides of the trunk part. The part recognition unit 130 identifies two joint points on the sides along the axis (principal axis) direction of the trunk part and positioned nearest from the surface on the head part side, as root joint points (joint points related to the shoulder joints) of the left and right arm parts. For example, the part recognition unit 130 identifies joint points includes within a thin torus (torus related to a cylinder) on the sides of the trunk part as the root joint points of the arm parts. Note that a predetermined value may be used for the torus thickness or the like. Then, the part recognition unit 130 recognizes parts mlh and mrh that include the root joint points of the left and right arm parts as a part corresponding to the left arm (part b5 or part b5+b6 in FIG. 4) and a part corresponding to the right arm (part b8 or part b8+b9 in FIG. 4), respectively.

Once having identified the part mlh corresponding to the left arm, the part recognition unit 130 determines whether or not there is a part having a position on the side close to the trunk part within the sphere (a coupling sphere) set at a position at the far end of the trunk part in the part mlh. Note that a predetermined value may be used for the diameter of the coupling sphere. Then, if there is a part mlh2 having a position on the side close to the trunk part within the coupling sphere, the part recognition unit 130 recognizes the part mlh as the part b5 corresponding to the left upper arm and the part mlh2 as the part b6 corresponding to the left forearm. On the other hand, if there is no part having a position on the side close to the trunk part within the coupling sphere, the part recognition unit 130 recognizes the part mlh as a part including both the upper arm part and the forearm part of the left arm. In this case, the part recognition unit 130 sets a "cutting flag" to the part mlh. This enables, for example, in FIG. 4, even when the parts b5 and b6 extend straight depending on the pose of the subject S, to recognize the parts b5 and b6 as a part of the left arm.

Similarly, once having identified the part mrh corresponding to the right arm, the part recognition unit 130 determines whether or not there is a part having a position on the side close to the trunk part within a sphere (a coupling sphere) set at a position at the far end of the trunk part in the part mrh. Note that a predetermined value may be used for the diameter of the coupling sphere. Then, if there is a part mrh2 having a position on the side close to the trunk part within the coupling sphere, the part recognition unit 130 recognizes the part mrh as the part b8 corresponding to the right upper arm and the part mrh2 as the part b9 corresponding to the right forearm. On the other hand, if there is no part having a position on the side close to the trunk part within the sphere, the part recognition unit 130 recognizes the part mrh as a part including both the upper arm part and the forearm part of the right arm. In this case, the part recognition unit 130 sets a "cutting flag" to the part mrh. This enables, for example, in FIG. 4, even when the parts b8 and b9 extend straight depending on the pose of the subject S, to recognize the parts b8 and b9 as a part of the right arm.

The skeleton shaping unit 132 executes a cutting process, a joining process, and a coupling process as skeleton shaping processes.

The cutting process is a process of separating a part into two distinct parts. A part to be separated is a part among the parts m in which a cutting flag has been set as described above. Note that a geometric model related to a part subject to the cutting process (i.e., a geometric model related to a part having a cutting flag set as described above) is an example of a first geometric model. A part having a cutting flag set is a part that has been recognized as a single part in fitting by a geometric model when it was in a straight extended state, for example, as in the case of an upper arm part and a forearm part (see parts b5 and b6 in FIG. 4). The cutting process separates such an inherently-two-part part into two distinct parts. Among the elements ($r_m$, $c_m^0$, and $e_m^0$) of the parameters θ, $r_m$ and $e_m^0$ of the two distinct parts remain as they are. On the other hand, the skeleton shaping unit 132 determines a joint position between $c_m^0$ of the two distinct parts (i.e., an intermediate joint point of the part having the cutting flag set) according to Formula 32. In the case of an intermediate joint point, the second term on the right side in Formula 32 is as follows. Note that when deriving an intermediate joint point, a derived result of $c_m^0$ and $e_m^0$ is used.

$$\xi_m^0 \cdot e_m^0 = \beta \langle x_n \cdot e_m^0 \rangle_p \qquad \text{[Formula 34]}$$

intermediate joint point where β is a constant as described above, and may be, for example, 1. In the case of β=1, the center of the part m ($=\langle x_n \cdot e_m^0 \rangle_p$) represents an intermediate point of the part m, which is inherently constituted with two parts. Alternatively, β may be set based on the shape information of the subject S obtained by another measurement.

The cutting process as such enables to cut a part m into two distinct parts in the case of the part m inherently constituted with two parts, and to derive three joint points. Therefore, for example, even when a leg part is extended and the elbow or knee is extended straight, three joint points can be derived by the cutting process.

The joining process is a process of deriving a hidden skeletal part of the subject S that can be corresponded with a line across two parts m, based on the positions $c_m^0$, directions $e_m^0$, and length parameters $l_m$ of the two parts m connected by the hidden skeletal part. Specifically, the joining process is a process of generating a hidden skeletal part as a line connecting two joint points related to predetermined two parts m. Note that a geometric model of predetermined two parts m subject to the joining process is an example of a second geometric model. Hidden skeletal parts include the skeletal parts b14 and b15 related to the hip joint and the skeletal parts b4 and b7 related to the shoulder joints, as described above with reference to FIG. 4. For the skeletal part b14 related to the hip joint, the two joint points subject to the joining process correspond to the joint point a0 on the bottom side of the part b1 and the joint point a14 on the trunk part side of the part b10, respectively. Also, for the skeletal part b15 related to the hip joint, the two predetermined joints correspond to the joint point a0 on the bottom surface of the part b1 and the joint point a15 on the trunk part side of the part b12, respectively. For the skeletal part b4 of the shoulder joint, the two predetermined joints correspond to the joint point a2 on the head part side of the part b2 and the joint point a4 on the trunk part side of the part b5, respectively. For skeletal part b7 of the shoulder joint, the two predetermined joints correspond to the joint point a2 on the head part side of the part b2 and the joint point a7 on the trunk part side of the part b8, respectively.

Thus, the joining process enables to derive hidden skeletal parts (lines corresponding to links) even if a joint model includes hidden skeletal parts.

The coupling process is a process of integrating (coupling) joint points (common joint points) related to the same joint derived from geometric models of different parts into one joint point. For example, joint points to be coupled are, for example, two joint points in a coupling sphere described above (joint points related to the joints a5, a8, a10, and a12 in FIG. 4). The coupling process related to the arm and leg parts as such is executed when a cutting flag is not set. Also, other joint points to be coupled are the two joint points (joint points related to the joint a2 in FIG. 4) obtained from both the geometric model of the head-part and the geometric model of the trunk part, which relate to the joint point of the neck. Also, other joint points to be coupled are, in the case where the first largest part m1 and the second largest part m2 in terms of the thickness $r_m$ are identified as the trunk part, the joint points between the part m1 and the part m2 (joint points related to the joint a1 in FIG. 4). In other words, the coupling process for the trunk part is executed when a cutting flag is not set.

The coupling process may be a process of simply selecting one of the joint points. Alternatively, the coupling process may adopt a method of using a mean value of the two joint points; a method of using a value of a part having a greater sum of posterior distributions for data items among the two parts related to the two joint points; a method of using a value obtained by giving weights by the sum of posterior distributions for data items; or the like.

Favorably, the skeleton shaping unit 132 further executes a symmetrization process as a skeleton shaping process. The symmetrization process is a process of correcting the parameters to be left-right symmetric for parts that are inherently and substantially left-right symmetric. Parts that are inherently and substantially left-right symmetric are, for example, the left and right arm parts and the left and right leg parts. For example, for the left and right arm parts (the same applies also to the left and right leg parts), the skeleton shaping unit 132 may unify the thickness $r_m$ and the length parameter $l_m$ among the parameters θ to those having the greater sum of posterior distributions for data items. For example, if the sum of posterior distributions for data items related to the left leg part is larger than the sum of posterior distributions for data items related to the right leg part, the thickness $r_m$ and the length parameter $l_m$ of the right leg part are corrected to the thickness $r_m$ and the length parameter $l_m$ of the left leg part. This enables to utilize the left-right symmetry to increase the precision of the thickness $r_m$ and the length parameter $l_m$.

The calibration information generation unit 134 generates calibration information based on a derived result of the parameters θ of the parts m, a derived result of the parameters $l_m$ of the parts m, a result of a part recognition process by the part recognition unit 130, a result of a skeleton shaping process by the skeleton shaping unit 132, and the like.

The calibration information includes part information on all parts of the subject S. All parts of the subject S are all parts based on the joint model, and in the example illustrated in FIG. 4, there are 15 parts. In the following, a part among all the parts of the subject S will be denoted as a "part k". Note that a part m denotes a part subject to fitting by a geometric model.

The part information may include, for example, information representing a correspondence relationship between a part k and the other parts of the subject S (see parts b1 to b15 in FIG. 4) (referred to as "part correspondence relationship information", below), the position, axial direction, length, thickness, and the like of the part k. In the present embodiment, as an example, the part information includes part correspondence relationship information, a position $c_k^{\ominus\ominus}$ of a joint point on the ancestor side of the part k as the position of the part k, a direction $e_k^{\Theta 0}$ of the part k, and a length parameter $l_m$ of the part m. The position $c_k^{\Theta 0}$ and the direction $e_k^{\Theta 0}$ represent initial values of the position and the direction (an example of a first parameter) of the part m in a certain pose $\Theta$.

The position $c_k^{\Theta 0}$ of the part k corresponds to the position at the end on the ancestor side of the part m derived based on the position $c_m^0$ and the like (see Formula 32 and Formula 33). If a cutting process has been executed, the position $c_k^{\Theta 0}$ of each of the two parts separated by the cutting process similarly corresponds to the joint point on the ancestor side of the part. For example, if a cutting process has been executed for a part m related to the leg part, the position $c_k^{\Theta 0}$ related to a part k related to the thigh part among the two separate parts of the part m corresponds to the joint point of the ancestor side. Also, among the two separate parts of the part m, the position $c_k^{\Theta 0}$ of another part k related to the shin part corresponds to the joint point on the ancestor side (i.e., the intermediate joint point of the part m and the joint point related to the knee) (see Formula 34). Also, the position $c_k^{\Theta 0}$ of a part k related to a hidden skeletal part corresponds to a joint point on the descendant side of a part that is connected to the hidden skeletal part on the ancestor side. For example, the position $c_k^{\Theta 0}$ of a part k corresponding to the part b4 corresponds to the joint point a2 on the descendant side of a part m corresponding to the part b2.

As the direction $e_k^{\Theta 0}$, the direction $e_m^0$ can be used as it is. Even if a cutting process has been executed for the part m, the direction $e_m^0$ of the part m is used as the respective directions $e_k^{\Theta 0}$ of the two parts separated by the cutting process. As the direction $e_k^{\Theta 0}$ of a part k related to a hidden skeletal part, a direction of a line related to the hidden skeletal part derived by the joining process is used.

Also, the calibration information includes information representing what types of geometric models are used for the respective parts for all the parts excluding hidden skeletal parts (referred to as "used geometric model information", below), and the geometric models. If a cutting process has been executed for a part m, the geometric model of each of the two parts separated by the cutting process is the geometric model associated with the part m. Note that in a modified example in which only one type of geometric model (e.g., a cylinder) is used, the used geometric model information is not required.

According to the single-scene skeleton recognition process of the present embodiment, as described above, a cutting process is executed for a result obtained by fitting using a geometric model. This enables to precisely recognize a joint connecting two parts even when the two parts are extended straight such as the trunk part, the arm parts, and the leg parts of the subject S. In other words, it is possible to precisely recognize a joint connecting two parts even in a situation where fitting only using a geometric model recognizes the parts as a single part (in a situation where two parts are recognized as nothing but a single part). Also, according to the present embodiment, a joining process is executed for a result obtained by fitting using a geometric model as described above. This enables to precisely recognize a hidden skeletal part that is hardly recognized precisely by fitting only using a geometric model. As such, according to the present embodiment, it is possible to precisely recognize a joint or skeletal part of the subject S based on point cloud data of the subject S.

Therefore, according to the present embodiment, it is possible to generate highly precise calibration information, and as a result, it is possible to increase the precision of a micro-fitting process that uses the calibration information, as will be described later.

Next, with reference to schematic flow charts in FIG. 7 and thereafter, an example of operations of the single-scene skeleton recognition unit 120 will be described.

Figure 7:
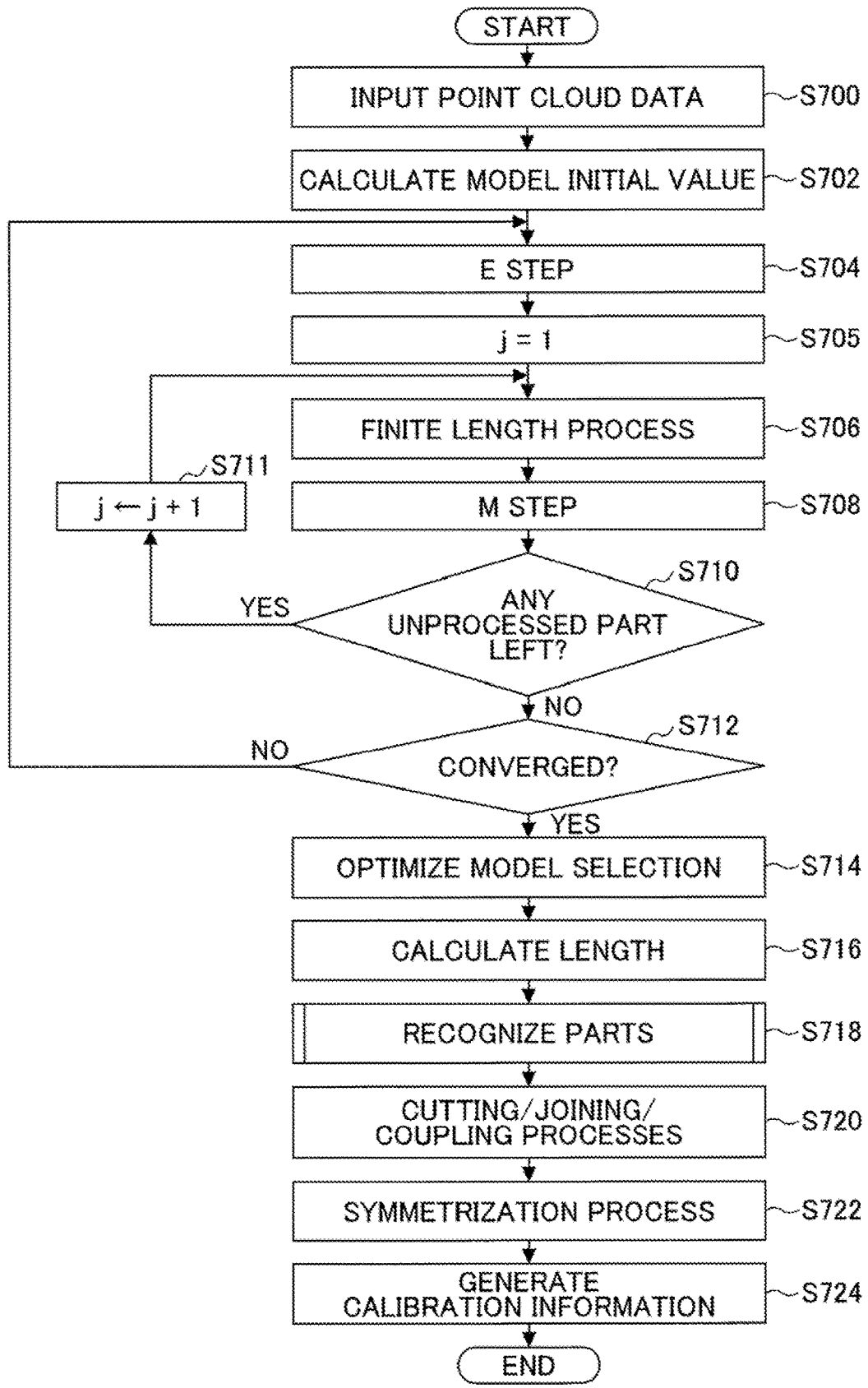
FIG. 7 is a schematic flow chart illustrating an example of overall operations of an object recognition system 1.
Figure 8:
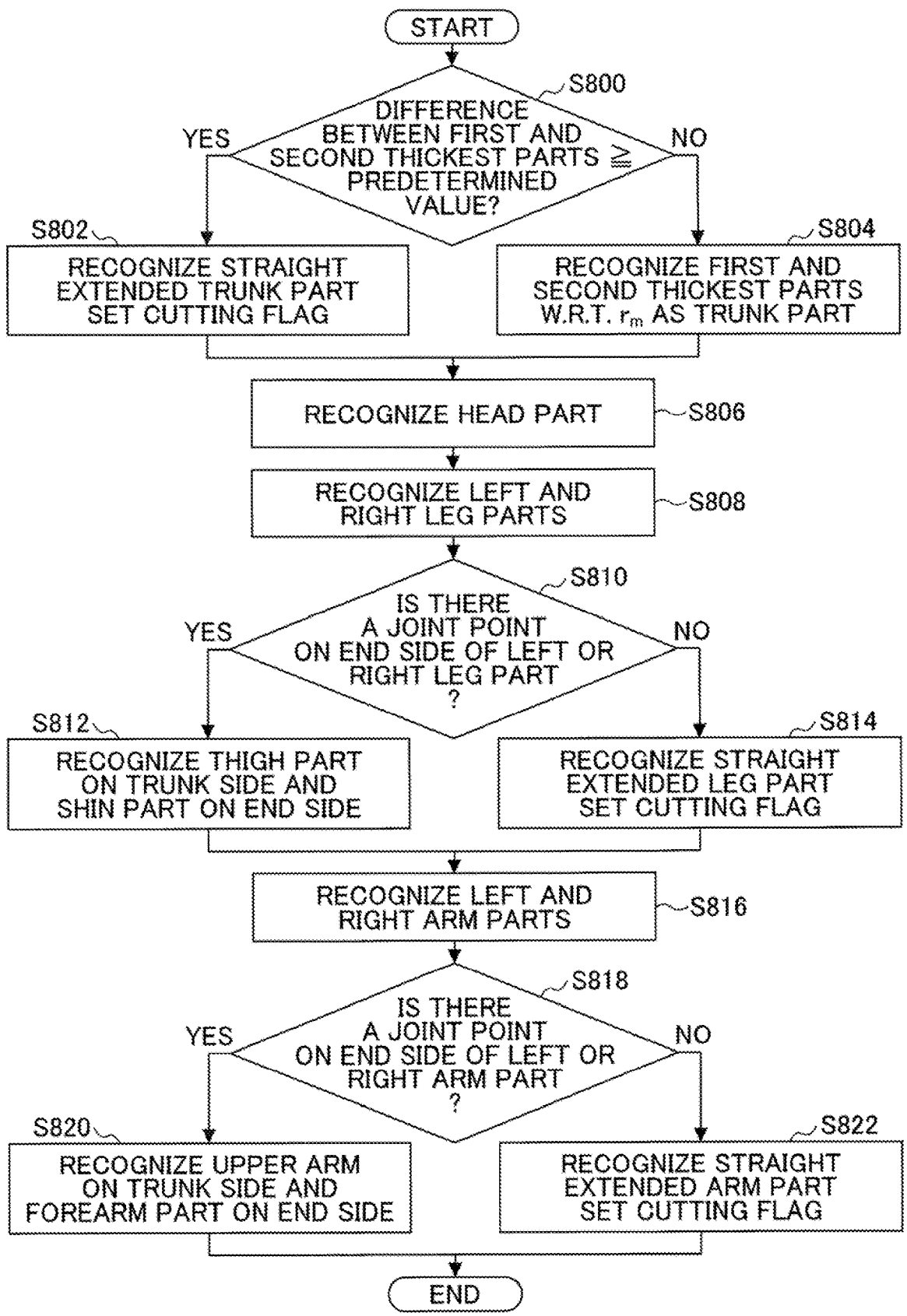
FIG. 8 is a schematic flow chart illustrating an example of a part recognition process.
Figure 9A:
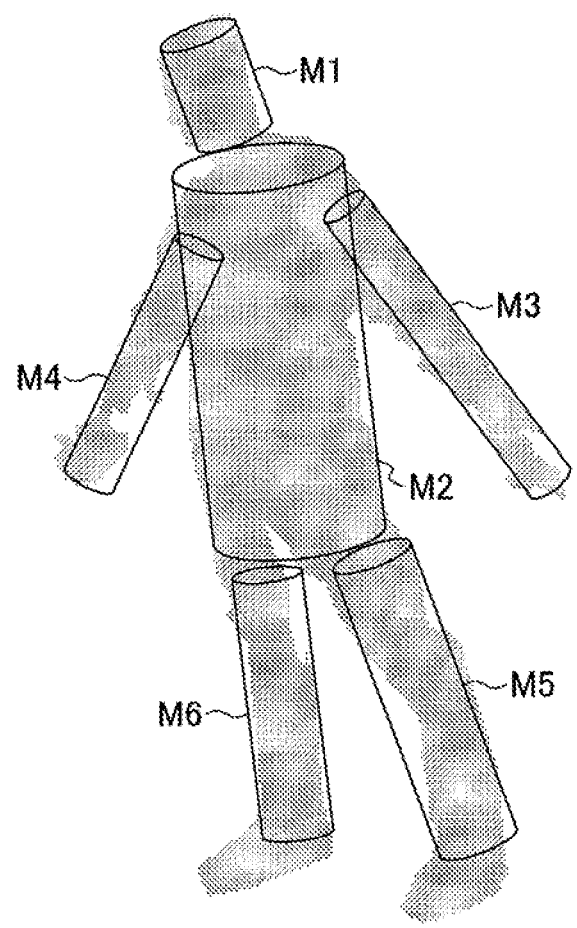
FIG. 9A is an explanatory diagram of a process executed by an object recognition system.
Figure 9B:
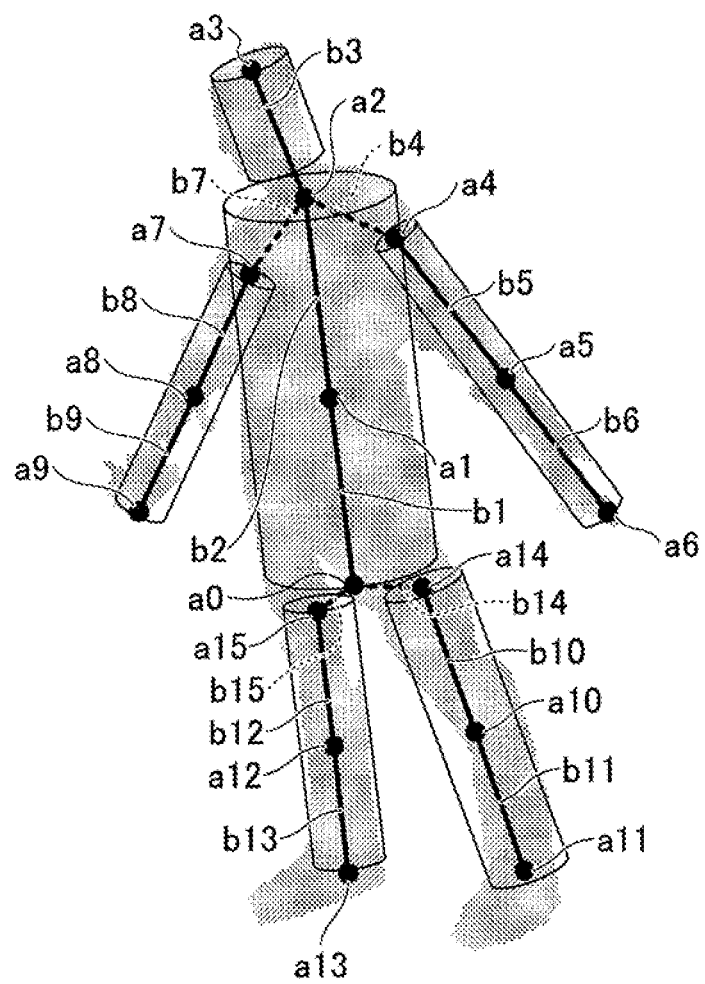
FIG. 9B is an explanatory diagram of a process executed by an object recognition system.

FIG. 7 is a schematic flow chart illustrating an example of overall operations of the single-scene skeleton recognition unit 120, and FIG. 8 is a schematic flow chart illustrating an example of a part recognition process. FIG. 9A and FIG. 9B are explanatory diagrams related to the processes in FIG. 7 and the like. Each of FIG. 9A and FIG. 9B illustrates point cloud data $x_n$ at a certain point in time (a single scene).

At Step S700, point cloud data $x_n$ at a certain point in time is input into the data input unit 110.

At Step S702, the clustering unit 122 obtains initial values used for fitting using a geometric model(s) based on the point cloud data $x_n$ obtained at Step S700. A process executed by the clustering unit 122 (the method of obtaining the initial values) is as described in detail above.

At Step S704, the EM algorithm unit 124 executes an E step of the EM algorithm based on the point cloud data $x_n$ obtained at Step S700 and the initial values obtained at Step S702. The E step of the EM algorithm is as described in detail above.

At Step S705, the EM algorithm unit 124 sets j=1.

At Step S706, the EM algorithm unit 124 executes a finite length process for the j-th part j (m=j). The finite length processing is as described in detail above.

At Step S708, the EM algorithm unit 124 executes an M step of the EM algorithm for the j-th part j (m=j) based on a result of the E step obtained at Step S704 and a result of the finite length process obtained at Step S706. The M step of the EM algorithm is as described in detail above.

At Step S710, the EM algorithm unit 124 determines whether or not there is an unprocessed part, i.e., whether or not j<M'. If there is an unprocessed part, the process proceeds through Step S711 to repeat Steps S706 and thereafter. If there is no unprocessed part, the process proceeds to Step S712.

At Step S711, the EM algorithm unit 124 increments j by only "1".

At Step S712, the EM algorithm unit 124 determines whether or not it reaches a convergence. As the convergence condition, it is possible to use, for example, the value of the log-likelihood function being less than or equal to a predetermined value, or the moving average of the log-likelihood function being less than or equal to a predetermined value.

At Step S714, the model optimization unit 126 executes a model optimization process. For example, the model optimization unit 126 calculates the sum of posterior distributions over data items and all parts for the geometric model used this time. Then, if the sum of posterior distributions over data items and all parts is less than a predetermined reference value, the model optimization unit 126 issues a command to the EM algorithm unit 124 to change the geometric model to execute Steps S704 to S712 again. Alternatively, regardless of the sum of posterior distributions over data items and all parts for the geometric model used this time, the model optimization unit 126 may issue a command to the EM algorithm unit 124 to change the geometric model to execute Steps S704 to S712 again. In this case, the model optimization unit 126 selects a geometric model with which the greatest sum of posterior distributions over data items and all parts is obtained, as the best-fitting type of geometric model.

When the processing up to Step S714 is completed, parameters θ ($r_m$, $c_m^0$, and $e_m^0$) related to multiple geometric models fit to the point cloud data $x_n$ are obtained as illustrated in FIG. 9A. In the example illustrated in FIG. 9A, six geometric models M1 to M6 fit to point cloud data $x_n$ are illustrated schematically. The geometric model M1 is a geometric model related to the head part of the subject S, the geometric model M2 is a geometric model related to the trunk part of the subject S, the geometric models M3 and M4 are geometric models related to the two arm parts of the subject S, and the geometric models M5 and M6 are geometric models related to the two leg parts of the subject S. In the example illustrated in FIG. 9A, the geometric models M1 to M6 are all cylinders.

At Step S716, the length calculation unit 128 derives the length parameter $l_m$ for each geometric model (see geometric models M1 to M6) based on the point cloud data $x_n$ and the parameters θ obtained through the processing up to Step S714. Deriving the length parameter $l_m$ includes deriving the length parameter $1^+_m$ and the length parameter $1^-_m$ for the center of each part m as described above.

At Step S718, the part recognition unit 130 executes a part recognition process. Although the part recognition process is as described above, an example of steps will be described below with reference to FIG. 8.

At Step S720, the skeleton shaping unit 132 executes a cutting process, a joining process, and a coupling process based on a result of the part recognition process obtained at Step S718 and the like. The skeleton shaping unit 132 executes a cutting process for each part having the cutting flag set. The cutting process is as described in detail above. Also, the joining process is as described above and includes deriving straight lines for the skeletal parts b14 and b15 related to the hip joint and for the skeletal parts b4 and b7 related to the shoulder joints. Also, the coupling process is as described in detail above.

When the processing up to Step S720 is completed, as schematically illustrated in FIG. 9B, the positions of the joints related to the cutting process, hidden skeletal parts, and the like are derived.

At Step S722, the skeleton shaping unit 132 executes a symmetrization process based on the sum of posterior distributions for data items obtained through Steps S704 to S712. The symmetrization process is as described in detail above.

At Step S722, the calibration information generation unit 134 generates calibration information based on processed results of Steps S704 to S722 in the current cycle. The method of generating calibration information is as described above.

Next, a part recognition process at Step S718 will be described with reference to FIG. 8.

At Step S800, the part recognition unit 130 determines whether or not the difference between the first and second thickest parts in terms of the thickness $r_m$ is greater than or equal to a predetermined value. If the determination result is "YES," the process proceeds to Step S802, or otherwise, to Step S804.

At Step S802, the part recognition unit 130 identifies the first thickest part m1 in terms of the thickness $r_m$ as the trunk part (the trunk part extended straight) and sets a cutting flag to the part m1. For example, in the example illustrated in FIG. 9A, the part to which the geometric model M2 is associated is identified as the first thickest part m1 that has the difference greater than or equal to the predetermined value with respect to the second thickest part, to which a cutting flag is set. Note that once the cutting flag has been set to the part m1 in this way, at Step S720 in FIG. 7, a cutting process will be executed for the part m1.

At Step S804, the part recognition unit 130 identifies the first thickest part m1 and the second thickest part m2 in terms of the thickness $r_m$ as the trunk part.

At Step S806, the part recognition unit 130 recognizes the head part. For example, the part recognition unit 130 recognizes a part mh near the top surface of the part m1 as the head part. For example, in the example illustrated in FIG. 9A, a part to which the geometric model M1 is associated is recognized as the head part.

At Step S808, the part recognition unit 130 recognizes the left and right leg parts near the bottom surface of the trunk part. In other words, as described above, the part recognition unit 130 identifies two joint points on the left and right near the bottom surface of the trunk part as the root joint points of the respective leg parts, and recognizes parts ml and mr having the two joint points as the parts corresponding to the left and right leg part.

At Step S810, the part recognition unit 130 determines whether or not there are joint points related to other parts ml2 and mr2 at the end sides (sides far from the trunk part) of the parts ml and mr related to the left and right leg parts recognized at Step S808. At this time, the part recognition unit 130 determines the left and right leg parts separately. If the determination result is "YES," the process proceeds to Step S812, or otherwise, to Step S814.

At Step S812, the part recognition unit 130 recognizes the parts ml and mr of the left and right leg parts recognized at Step S808 as the thigh parts and recognizes the other parts ml2 and mr2 recognized at Step S810 as the shin parts. Note that in this case, at Step S720 in FIG. 7, a coupling process will be executed for the parts ml and ml2, and a coupling process will be executed for the parts mr and mr2.

At Step S814, the part recognition unit 130 recognizes the parts ml and mr of the left and right leg parts recognized at Step S808 as straight extended leg parts and sets cutting flags to the parts ml and mr. Note that once the cutting flags have been set to the parts ml and mr in this way, at Step S720 in FIG. 7, cutting processes will be executed for the parts ml and mr, respectively.

At Step S816, the part recognition unit 130 recognizes the left and right arm parts on the left and right sides of the upper portion (far from the leg parts) of the trunk part. In other words, as described above, the part recognition unit 130 identifies two joint points included in a thin torus on the side of the trunk part as the root joint points of the respective arm parts, and recognizes parts mlh and mrh having the two joint points as the parts corresponding to the left and right arm parts.

At Step S818, the part recognition unit 130 determines whether or not there are joint points related to other parts mlh2 and mrh2 at the end sides (sides far from the trunk part) of the parts mlh and the mrh corresponding to the left and right arm parts recognized at Step S808. At this time, the part recognition unit 130 determines the left and right arm parts separately. If the determination result is "YES," the process proceeds to Step S820, or otherwise, to Step S822.

At Step S820, the part recognition unit 130 recognizes the parts mlh and mrh corresponding to the left and right arm parts recognized at Step S816 as the upper arm parts, and recognizes the other parts mlh2 and mrh2 recognized at Step S818 as the forearm parts. Note that in this case, at Step S720 in FIG. 7, a coupling process will be executed for the parts mlh and mlh2, and a coupling process will be executed for the parts mrh and mrh2.

At Step S822, the part recognition unit 130 recognizes the parts mlh and mrh of the left and right arm parts recognized at Step S816 as straight extended arm parts and sets cutting flags to the parts mlh and mrh. Note that once the cutting flags have been set to the parts mlh and mrh in this way, cutting processes will be executed for the parts mlh and mrh, respectively, at Step S720 in FIG. 7.

According to the processes illustrated in FIG. 7 and FIG. 8, based on point cloud data $x_n$ of the subject S at a certain point in time (a single scene), it is possible to precisely recognize the joints or the skeleton of the subject S. Note that the processes illustrated in FIG. 7 and FIG. 8 may be executed repeatedly for each frame cycle; or for the next frame, the parameters θ and variance $\sigma^2$ obtained in the previous frame, and the geometric models used in the previous frame may be used to derive parameters θ and the like related to the next frame.

Note that in the single-scene skeleton recognition process described above, all items of point cloud data $x_n$ are assumed to exist in the vicinity of the surfaces of geometric models in the formulation; however, point cloud data $x_n$ may include noise and the like. If such data items separated from the surfaces are mixed, the posterior distribution to be calculated at the E step may become numerically unstable and may not be calculated correctly. Thereupon, a uniform distribution may be added to the distribution $p(x_n)$ as a noise term as follows:

$$p(x_n) = \frac{1-u}{M'(2\pi\sigma^2)^{1/2}} \sum_{m=1}^{M'} \exp\left(-\frac{\varepsilon_m(x_n, \theta)^2}{2\sigma^2}\right) + \frac{u}{N} \quad \text{[Formula 35]}$$

where u represents a weight. At this time, the posterior distribution is modified as follows:

$$p_{nm} = \frac{\exp(-\varepsilon_m(x_n, \theta)^2/2\sigma^2)}{\sum_{m=1}^{M'} \exp(-\varepsilon_m(x_n, \theta)^2/2\sigma^2) + u_c} \quad \text{[Formula 36]}$$

where $u_c$ is defined as follows:

$$u_c \equiv (2\pi\sigma^2)^{1/2} u M'/(1-u)N \quad \text{[Formula 37]}$$

This introduces $u_c$ to the denominator, which eliminates numerical instabilities. Also, the change is made only in the E step, and the M step may remain unchanged.

[Micro-Fitting Processing Unit]

The symbols used in the description of [Micro-fitting processing unit] below are substantially the same as the symbols used in the description of [Single-scene skeleton recognition unit] described above unless noted otherwise. Note that for point cloud data $x_n$, although the same symbol "$x_n$" is used, as described above, point cloud data $x_n$ used in the micro-fitting processing unit 150 is data obtained at a point in time (frame) later than the point cloud data $x_n$ used in the single-scene skeleton recognition unit 120. In the following, a point in time related to point cloud data $x_n$ used in the single-scene skeleton recognition unit 120 will be referred to as the "first point in time," and a point in time related to point cloud data $x_n$ used in the micro-fitting processing unit 150 will be referred to as the "second point in time". Again, the second point in time is later than the first point in time; and it is assumed here that, for example, it is later by a tiny amount of time corresponding to a single frame cycle.

Also, in the description of [Micro-fitting processing unit] below, a part m is a part to which fitting is applied, and in this regard, virtually the same as in the description of [Single-scene skeleton recognition unit] described above; however, there is a difference only in the following respect. That is, in the single-scene skeleton recognition process, a part m may corresponds with two parts of the subject S simultaneously as described above; in contrast, in the following micro-fitting process, a part m does not correspond with two parts of the subject S simultaneously. Therefore, in the description of [Micro-fitting processing unit], for the joint model illustrated in FIG. 4, a part m has a one-to-one correspondence with one of the 15 parts excluding the hidden skeletal parts.

The micro-fitting processing unit 150 executes a micro-fitting process using calibration information generated by the single-scene skeleton recognition unit 120 as described above. In the following, a parameter related to the parameters θ described above, which represents a joint (joint rotation) of the subject S and rotation and translation of the center of gravity of the subject S, is referred to as a "deformation parameter $\theta_{ar}$". The calibration information also includes the used geometric model information (information representing the geometric models used for the respective parts in the single-scene skeleton recognition process) as described above. In the micro-fitting process, the geometric models used for obtaining calibration information are to be used successively. For example, if a cylinder is used for a certain part for generating the calibration information, the cylinder is used for the part in the micro-fitting process.

The micro-fitting processing unit 150 includes a surface residual calculation unit 151, a posterior distribution calculation unit 152, a finite length processing unit 154, a variance update unit 155, a minute-change calculation unit 156, and a parameter update unit 158 as illustrated in FIG. 3.

The surface residual calculation unit 151 calculates a surface residual $\varepsilon_{nm}$ and the differential $\varepsilon'_{nm}$ of the surface residual. In the micro-fitting, as in the single-scene skeleton recognition process described above, a Gaussian distribution is assumed for the point cloud data $x_n$ in terms of the surface residual $\varepsilon_m(x_n, \theta_{ar})$ for each part m (difference in the direction perpendicular to the surface), which is specifically expressed as follows:

$$p(x_n) = \frac{1}{(M-h)(2\pi\sigma^2)^{1/2}} \sum_{m=1}^{M-h} \exp\left(-\frac{\varepsilon_m(x_n, \theta_{ar})^2}{2\sigma^2}\right) \quad \text{[Formula 38]}$$

where M represents the total number of parts of the joint model (total number of parts including hidden parts), which is "15" in the joint model illustrated in FIG. 4. Therefore, M may differ from M' used in the single-scene skeleton recognition unit 120. Also, "h" represents the number of hidden skeletal parts (examples of a second part), which is "4" in the joint model illustrated in FIG. 4. "M−h" is used for excluding parts that do not contribute to fitting. In other words, M−h is the number of parts (examples of a first part) to be fit by the micro-fitting process. Here, "M−h" is used instead of "M" used in the single-scene skeleton recognition unit 120 because M'=M−h does not always hold. Also, "M−h" can be set as a fixed value because in the micro-fitting process, unlike in the single-scene skeleton recognition process, because it is possible to track each part even when an arm or leg is in a straight extended state. At this time, the corresponding log-likelihood function is as follows:

$$E(\theta_{ar}, \sigma^2) = \qquad\qquad\text{[Formula 39]}$$
$$-\sum_{n=1}^{N} \ln \frac{1}{(M-h)(2\pi\sigma^2)^{1/2}} \sum_{m=1}^{M-h} \exp\left(-\frac{\varepsilon_m(x_n, \theta_{ar})^2}{2\sigma^2}\right)$$

The surface residual $\varepsilon_{nm}$ and the differential $\varepsilon'_{nm}$ of the surface residual are defined as follows. Note that $\theta_{ar}$ represents the deformation parameter.

$$\varepsilon_{nm} \equiv \varepsilon_m(x_n, \theta_{ar}) \qquad\qquad\text{[Formula 40]}$$
$$\varepsilon'_{nm} \equiv \frac{\partial \varepsilon_m(x_n, \theta_{ar})}{\partial \theta_{ar}}$$

Note that in the description of [Micro-fitting processing unit], the notation of $\langle \rangle_p$ is an averaging operation that uses the posterior distribution $p_{nm}$ similarly; however, taking the difference between "M" and "M−h" into account, it is defined for any tensor or matrix $a_{nm}$ as follows:

$$\langle a_{nm} \rangle \equiv \sum_{n=1}^{N} \sum_{m=1}^{M-h} p_{nm} a_{nm} \qquad\qquad\text{[Formula 41]}$$

If the geometric model is a cylinder, the surface residual may be expressed, for example, as follows where the position $c_m^{\Theta}$ and the direction $e_m^{\Theta}$ represent the position and the direction of a part m in a certain pose $\Theta$. Note that the position $c_m^{\Theta}$ is the position of a joint point on the ancestor side of the part m as defined previously.

$$\varepsilon_m(x_n, \theta_{ar}) = |(x_n - c_m^{\Theta}) \times e_m^{\Theta}| - r_m \qquad\qquad\text{[Formula 42]}$$

Note that in Formula 42, although the right-hand side is not expressed as a difference between the squares, terms of the squares may be used as in Formula 3 described above. Note that in the single-scene skeleton recognition process, expressing the exponent part as a difference of the squares linearizes the formula. At this time, the differential of the surface residual is expressed as follows:

$$\varepsilon'_{nml'i'} = (\delta_{ml'} + \chi_{ml'}) \qquad\qquad\text{[Formula 43]}$$
$$\left(e_m^{\Theta} \times \frac{(x_n - c_m^{\Theta}) \times e_m^{\theta}}{|(x_n - c_m^{\Theta}) \times e_m^{\Theta}|}\right) \cdot \{e_{l'i'}^{\Theta} \times (x_n - c_{l'}^{\Theta})\} \; (l \le M - f)$$

$$\varepsilon'_{nm, M-f+1, i'} = \left(\frac{(x_n - c_m^{\Theta}) \times e_m^{\Theta}}{|(x_n - c_m^{\Theta}) \times e_m^{\Theta}|}\right) \cdot \{e_m^{\Theta} \times (\hat{e}_{i'} \times x_n)\} \qquad\text{[Formula 44]}$$

$$\varepsilon'_{nm, M-f+2, i'} = \left(\frac{(x_n - c_m^{\Theta}) \times e_m^{\Theta}}{|(x_n - c_m^{\Theta}) \times e_m^{\Theta}|}\right) \cdot (e_m^{\Theta} \times \hat{e}_{i'}) \qquad\text{[Formula 45]}$$

where the subscript 1' indicates a movable part and the total number is M−f (e.g., 13); $\varepsilon'_{nml'i'}$ represents differential of the surface residual with respect to the movable part; $\varepsilon'_{nm, M-f+1, i'}$ represents differential of the surface residual with respect to rotation of the center of gravity of the subject S; and $\varepsilon'_{nm, M-f+2, i'}$ represents differential of the surface residual with respect to translation of the center of gravity of the subject S.

$\delta_{ml'}$ is the Kronecker delta expressed as follows:

$$\delta_{kl'} = \begin{cases} 1 & k = l' \\ 0 & \text{other} \end{cases} \qquad\qquad\text{[Formula 46]}$$

Also, $\chi_{ml'}$ is expressed as follows:

$$\chi_{kl'} = \begin{cases} 1 & \text{if part } l \text{ is an ancestor of part } k \\ 0 & \text{other} \end{cases} \qquad\text{[Formula 47]}$$

Figure 11:
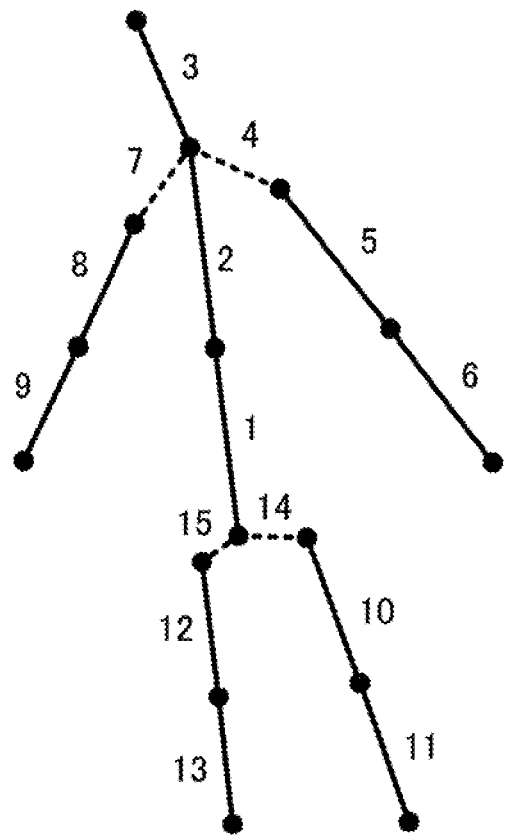
FIG. 11 is a diagram illustrating an example of assignment of numbers to parts for describing $_\chi kl'$.

$\chi_{ml'}$ is a parameter representing an ancestor-descendant relationship between a part m and a part 1' (1'=1, 2, . . . , 13); the parameter representing an ancestor-descendant relationship will be described later with reference to FIGS. 10 and 11 in connection with a part k and a part 1'. Note that an ancestor-descendant relationship can be determined based on the part correspondence relationship information included in the calibration information.

In the case of a cone, the surface residual $\varepsilon_m(x_n, \theta_{ar})$ may be expressed as follows. Note that in a cone (substantially the same in an elliptical cone), the position $c_m^{\Theta}$ corresponds to the vertex position in a certain pose $\Theta$, and the direction $e_m^{\Theta}$ in the pose $\Theta$ is a unit vector of the central axis.

$$\varepsilon_m(x_n, \theta_{ar}) = |(x_n - c_m^{\Theta}) \times e_m^{\Theta}| |n_m \times e_m^{\Theta}| - (x_n - c_m^{\Theta}) \cdot e_m^{\Theta} n_m \cdot e_m^{\Theta} \qquad\text{[Formula 48]}$$

The vector nm is as described above with Formula 22. In the case of a trapezoidal cylinder, it may be substantially the same as in the case of a cone. Also, in the case of an elliptical cylinder, the surface residual $\varepsilon_m(x_n, \theta_{ar})$ may be expressed as follows:

$$\varepsilon_m(x_n, \theta_{ar}) = \frac{\left|\frac{(x_n - c_m^{\Theta}) \times}{e_m^{\Theta} - d_m n'_m}\right| + \left|\frac{(x_n - c_m^{\Theta}) \times}{e_m^{\Theta} + d_m n'_m}\right| - 2a_m}{\left\|\frac{(x_n - c_m^{\Theta}) \times}{e_m^{\Theta} - d_m n'_m}\right\| \left|\frac{(x_n - c_m^{\Theta}) \times}{e_m^{\Theta} - d_m n'_m}\right| + \left\|\frac{(x_n - c_m^{\Theta}) \times}{e_m^{\Theta} + d_m n'_m}\right\| \left|\frac{(x_n - c_m^{\Theta}) \times}{e_m^{\Theta} + d_m n'_m}\right|} \qquad\text{[Formula 49]}$$

where dm and the like are as described above with Formula 23.

Also, in the case of an elliptical cone, the surface residual $\varepsilon_m(x_n, \theta_{ar})$ may be expressed as follows:

$$\varepsilon_m^2(x_n, \theta_{ar}) = |x_n - c_m^{\Theta}|^2 - \frac{\left\{\frac{(x_n - c_m^{\Theta}) \cdot e_m^{\Theta} \cos\psi_{m1} +}{|(x_n - c_m^{\Theta}) \times e_m^{\Theta}|} \sqrt{\sin^2\psi_{m1} - (\sin^2\psi_{m1} - \cos^2\psi_{m1}\tan^2\psi_{m2})\left(\frac{(x_n - c_m^{\Theta}) \times e_m^{\Theta}}{|(x_n - c_m^{\Theta}) \times e_m^{\Theta}|} \cdot n'_m\right)^2}\right\}^2}{1 - (\sin^2\psi_{m1} - \cos^2\psi_{m1}\tan^2\psi_{m2})\left(\frac{(x_n - c_m^{\Theta}) \times e_m^{\Theta}}{|(x_n - c_m^{\Theta}) \times e_m^{\Theta}|} \cdot n'_m\right)^2} \qquad\text{[Formula 50]}$$

where $\psi_{m1}$ and the like are as described above with Formula 24. In the case of a trapezoidal elliptical cylinder, the surface residual $\varepsilon_m(x_n, \theta_{ar})$ may be substantially the same as in the case of an elliptical cone.

The posterior distribution calculation unit 152 calculates posterior distributions $p_{nm}$ in a micro-fitting process. The posterior distribution $p_{nm}$ in a micro-fitting process is as follows, taking the difference between "M'" and "M–h" into account.

$$p_{nm} = \frac{\exp(-\varepsilon_m(x_n, \theta_{ar})^2/2\sigma^2)}{\sum_{m=1}^{M-h} \exp(-\varepsilon_m(x_n, \theta_{ar})^2/2\sigma^2)}$$ [Formula 51]

The finite length processing unit 154 executes a finite length process based on the posterior distribution $p_{nm}$ obtained by the posterior distribution calculating unit 152. As described above, the finite length process calculates the posterior distribution $p_{nm}$ only for data items that satisfy a predetermined condition among the items of point cloud data $x_n$, and sets the posterior distribution $p_{nm}$ to 0 for the other data items. In the micro-fitting process, data items that satisfy the predetermined condition may be, for example, data items that satisfy the following formula.

$$0 < (x_n - c_m^\Theta) \cdot e_m^\Theta < l_m$$ [Formula 52]

where $l_m$ is a length parameter included in the calibration information (i.e., the length parameter $l_m$ of a part m derived by the length calculation unit 128).

The variance update unit 155 derives (updates) the variance after a minute change $(\sigma_0^2 + \Delta\sigma^2)$. In the maximization problem of a likelihood function, a solution can be derived by linear approximation. In other words, by setting the differential with respect to $\sigma^2$ in Formula 39 to 0, the variance after the minute change $(\sigma_0^2 + \Delta\sigma^2)$ is obtained. Note that the variance $\sigma_0^2$ is an initial value and is obtained by the single-scene skeleton recognition unit 120. For example, the variance after the small change $(\sigma_0^2 + \Delta\sigma^2)$ may be expressed as follows:

$$\sigma_0^2 + \Delta\sigma^2 = \langle \varepsilon_{nm}^2 \rangle$$ [Formula 53]

The minute-change calculation unit 156 calculates a minute change $\Delta\theta$ of the deformation parameter $\theta_{ar}$. Here, in the maximization problem of the likelihood function, like the variance $\sigma^2$, a solution can be derived by linear approximation as follows. That is, the second point in time is after the first point in time by only a tiny amount of time; therefore, it is expected that the point cloud data $x_n$ at the second point in time does not change significantly from the point cloud data $x_n$ at the first point in time. For this reason, it is expected that the deformation parameter $\theta_{ar}$ at the second point in time does not change significantly from the deformation parameter $\theta_{ar}$ at the first point in time. Therefore, it is assumed that the deformation parameter $\theta_{ar}$ at the second point in time is represented by the minute change $\Delta\theta$ from the deformation parameter $\theta_{ar}$ at the first point in time.

$$0 = \frac{\partial E(\theta_{ar} + \Delta\theta, \sigma_0^2)}{\partial \theta_{ar}}$$ [Formula 54]

$$\simeq \frac{-1}{\sigma_0^2(M-h)(2\pi\sigma_0^2)^{1/2}} \langle \varepsilon_{nm}\varepsilon'_{nm} + \varepsilon'_{nm}\varepsilon'^T_{nm}\Delta\theta \rangle$$

Therefore, the minute change $\Delta\theta$ of the deformation parameter $\theta_{ar}$ is expressed as follows by using the surface residual $\varepsilon_{nm}$ and the differential $\varepsilon'_{nm}$ of the surface residual (see Formula 40).

$$\Delta\theta = -\langle \varepsilon'_{nm}\varepsilon'^T_{nm}\rangle^{-1}\langle \varepsilon_{nm}\varepsilon'_{nm}\rangle$$ [Formula 55]

Note that a specific method of calculating the minute change $\Delta\theta$ will be described later in connection with the description of the parameter update unit 158 coming next.

The parameter update unit 158 derives (updates) the position $c_k^{\Theta+\Delta\Theta}$ and the direction $e_k^{\Theta+\Delta\Theta}$ by deriving (updating) the changes $\Delta c_k^\Theta$ and $\Delta e_k^\Theta$ (examples of a second parameter) of the position $c_k^\Theta$ and the direction $e_k^\Theta$, respectively, based on the minute change $\Delta\Theta$ calculated by the minute-change calculation unit 156. Note that the position $c_k^\Theta$ and the direction $e_k^\Theta$ represent the position and the direction of a part k in a certain pose $\Theta$ as described above. As the initial values of the position $c_k^\Theta$ and the direction $e_k^\Theta$, the positions $c_k^{\Theta 0}$ and the direction $e_k^{\Theta 0}$ included in the calibration information are used.

The positions $c_k^{\Theta+\Delta\Theta}$ and the directions $e_k^{\Theta+\Delta\Theta}$ can be expressed, respectively, as follows. Note that parts k include hidden parts; therefore, in the joint model illustrated in FIG. 4, k=1, 2, . . . , 15. Note that the direction $e_k^{\Theta+\Delta\Theta}$ has been updated in an aspect where the norm is preserved.

$$c_k^{\Theta+\Delta\Theta} = c_k^\Theta + \Delta c_k^\Theta$$ [Formula 56]

$$e_k^{\Theta+\Delta\Theta} = e_k^\Theta + \Delta e_k^\Theta \times e_k^\Theta$$ [Formula 57]

Here, based on the forward kinematics of a mechanistic model, $\Delta c_k^\Theta$ and $\Delta e_k^\Theta$ can be derived as follows:

$$\Delta c_k^\Theta = \sum_{i'=0,x,xx}\sum_{l'=1}^{M-f} \chi_{kl'}\Delta\theta_{l'i'}e_{l'i'}^\Theta \times (c_k^\Theta - c_{l'}^\Theta) + \sum_{i'=1}^{d}(\Delta\theta_{M-f+1,i'}\times c_k^\Theta - \Delta\theta_{M-f+2,i'}\hat{e}_{i'})$$ [Formula 58]

$$\Delta e_k^\Theta = \sum_{i'=0,x,xx}\sum_{l'=1}^{M-f}(\delta_{kl'}+\chi_{kl'})\Delta\theta_{l'i'}e_{l'i'}^\Theta + \sum_{i'=1}^{d}\Delta\theta_{M-f+1,i'}\hat{e}_{i'}$$ [Formula 59]

where $\Delta\theta_{l'i'}$, $\Delta\theta_{M-f+1,i'}$, and $\Delta\theta_{M-f+2,i'}$ are elements of the minute change $\Delta\theta$; $\Delta\theta_{l'i'}$ represents rotation of the joint of a part l'(l'=1, 2, . . . , M–f); $\Delta\theta_{M-f+1,i'}$ represents rotation of the center of gravity of the subject S; and $\Delta\theta_{M-f+1,i'}$ represents translation of the center of gravity of the subject S. Also, i' represents three degrees of freedom of rotation where i'=0, X, XX; d represents the spatial dimension and d=3; and f represents the number of immobile joints. An immobile joint is, for example, a joint (see the joint a0 in FIG. 4) related to a pelvic part (see the parts b14 and b15 in FIG. 4).

In the case where the geometric model is a cylinder, $\Delta\theta_{l'i'}$, $\Delta\theta_{M-f+1,i'}$, and $\Delta\theta_{M-f+2,i'}$ are derived based on Formula 43, Formula 44, Formula 45, and Formula 55. In other words, $\varepsilon'_{nml'i'}$ is the differential of the surface residual for obtaining $\Delta\theta_{l'i'}$ in Formula 58 and Formula 59 from Formula 55 described above. Similarly, $\varepsilon'_{nm,M-f+2,i'}$ is the differential of the surface residual for obtaining $\Delta\theta_{M-f+1,i'}$ in Formula 58 and Formula 59 from Formula 55 described above. Similarly, $\varepsilon'_{nm,M-f+2,i'}$ is the differential of the surface residual for obtaining $\Delta\theta_{M-f+2,i'}$ in Formula 58 from Formula 55 described above. Note that for geometric models other than a cylinder, similar derivation can be executed by using the surface residual described above.

Also, the vectors used in Formula 58 and Formula 59 and the generators for determining angular changes are as follows. Note that in the following, n is a unit vector (fixed vector) and may be, for example, a unit vector in the direction of the distance image sensor 21.

$$\hat{e}_1 = \begin{pmatrix} 1 \\ 0 \\ 0 \end{pmatrix}, \hat{e}_2 = \begin{pmatrix} 0 \\ 1 \\ 0 \end{pmatrix}, \hat{e}_3 = \begin{pmatrix} 0 \\ 0 \\ 1 \end{pmatrix} \quad \text{[Formula 60]}$$

$$e_{k0}^{\ominus} \equiv e_k^{\ominus}, \; e_{kx}^{\ominus} \equiv \frac{n \times e_k^{\ominus}}{|n \times e_k^{\ominus}|}, \; e_{kxx}^{\ominus} \equiv \frac{e_k^{\ominus} \times (n \times e_k^{\ominus})}{|e_k^{\ominus} \times (n \times e_k^{\ominus})|} \quad \text{[Formula 61]}$$

Also, $\delta_{kl'}$ is the Kronecker delta, which is the same as described above. Also, $\chi_{kl'}$ is a parameter representing an ancestor-descendant relationship between a part k (k=1, 2, ..., 15) and a part l' (l'=1, 2, ..., 13), for example, as illustrated in FIG. 10. The part numbers in FIG. 10 are as illustrated in FIG. 11. For example, if part m=part 6 and part l'=part 5, $\chi_{56}$=1. This is because the part 5 is located on the ancestor side of the part 6. Note that in the example illustrated in FIG. 10 and FIG. 11, the last two numbers of "14" and "15" are assigned to the immobile pelvic part, and these two numbers are excluded from the columns. Also, a row and a column having the same number correspond to the same part.

Note that here, summarizing the subscript notations, the subscript k ranges over all parts, and the total number is M. The subscript m ranges over parts to which fitting is applied, and the total number is M−h. The subscript l' ranges over movable parts, and the total number is M−f. Note that these subscripts do not necessarily refer to the same part even when the same number is assigned.

In this way, $\Delta c_k^{\ominus}$ and $\Delta e_k^{\ominus}$ can be derived by substituting $\Delta \theta_{l',i'}, \Delta \theta_{M-f+1,i'},$ and $\Delta \theta_{M-f+2,i'}$ for Formula 58 and Formula 59. Also, once $\Delta c_k^{\ominus}$ and $\Delta e_k^{\ominus}$ have been obtained, the positions $c_k^{\ominus-\Delta\ominus}$ and the directions $e_k^{\ominus+\Delta\ominus}$ of a part k can be derived based on the update formulas of Formula 56 and Formula 57.

In the present embodiment, as an example, all joints are assumed to have three degrees of freedom as in the case of spherical joints. For example, all joints are assumed to be rotatable, vertically swingable, and horizontally swingable around axes as in the case of shoulder and hip joints. However, in practice, some joints have limited degrees of freedom. For example, the elbow has only one degree of freedom. In this respect, it is difficult to identify a movable axis for a nearly axially symmetric part. Therefore, in the present embodiment, for example, identification of a movable axis is avoided, and rotation around an axis constructed by using a certain fixed vector n is considered for all joints. However, axially symmetric geometric models such as cylinders and trapezoidal cylinders are excluded because the degree of rotational freedom around the axis is indefinite. Specifically, axially symmetric geometric models are given two degrees of freedom excluding the degree of freedom around the axis. Therefore, for the axially symmetric geometric models, among $\Delta \theta_{l'0}, \Delta \theta_{l'X},$ and $\Delta \theta_{l'XX}$, only $\Delta \theta_{l'X}$ and $\Delta \theta_{l'XX}$ are calculated excluding the joint rotation around the axis $\Delta \theta_{l'0}$. This enables to efficiently reduce the computational load. Note that when it is desired to obtain a rotation angle with respect to a movable axis in practice, it can be obtained by transformation by a rotation matrix.

Next, with reference to a schematic flow chart in FIG. 12, an example of operations of the object recognition system 1 according to the present embodiment will be described together with the micro-fitting process.

Figure 12:
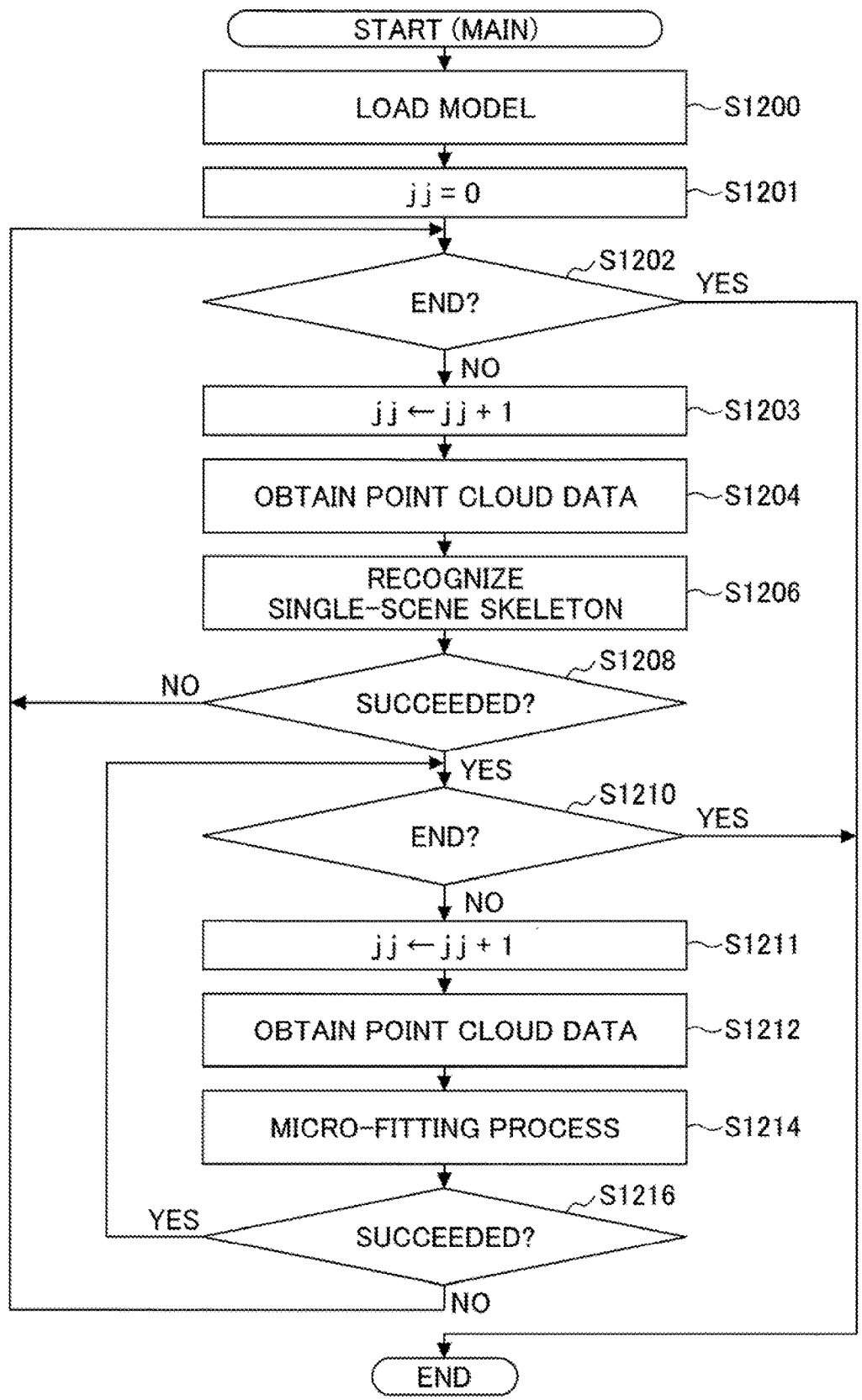
FIG. 12 is a schematic flow chart of an example of overall operations.

FIG. 12 is a schematic flow chart illustrating an example of overall operations of the object recognition system 1.

At Step S1200, the data input unit 110 obtains information representing a joint model to be used. For example, the data input unit 110 obtains information representing the joint model illustrated in FIG. 4. The information representing the joint model may be information representing the number of joints (parts), a connection relationship, parts to be fit, movable joints, and the like.

At Step S1201, the data input unit 110 sets jj=0.

At Step S1202, the data input unit 110 determines whether or not a predetermined process-termination condition is satisfied. For example, in the case of non-real-time processing, the predetermined process-termination condition may be satisfied when processing of all point cloud data items to be processed (e.g., point cloud data at multiple points in time in a time series) has been completed. Also, in the case of real-time processing, the predetermined process-termination condition may be satisfied when a termination command is input by the user or point cloud data related to the current frame cycle is not input. If the determination result is "YES," the process ends as determined, or otherwise, the process proceeds to Step S1204.

At Step S1203, the data input unit 110 increments jj by only "1".

At Step S1204, the data input unit 110 obtains point cloud data related to an object to be processed at one point in time, the point cloud data corresponds to the jj-th data (i.e., jj-th frame) in a time series. For example, in the case of real-time processing, point cloud data related to the current frame cycle corresponds to point cloud data related to one point of processing.

At Step S1206, the single-scene skeleton recognition unit 120 executes a single-scene skeleton recognition process based on the point cloud data obtained at Step S1204. The single-scene skeleton recognition process is as described above.

At Step S1208, the single-scene skeleton recognition unit 120 determines whether or not the single-scene skeleton recognition process has succeeded. Specifically, if determining that calibration information (the position $c_k^{\ominus 0}$ and the direction $e_k^{\ominus 0}$, etc.) satisfying a first predetermined criterion has been derived in the single-scene skeleton recognition process, the single-scene skeleton recognition unit 120 determines that the single-scene skeleton recognition process has succeeded. For example, if determining that a predetermined number of parts can be recognized and the sum of posterior distributions $p_{nm}$ for data items of each part is greater than or equal to a predetermined value Th1, the single-scene skeleton recognition unit 120 determines that calibration information satisfying the first predetermined criterion has been derived. The predetermined number of parts may correspond to the number of all parts (all parts defined in the joint model) except for hidden parts. Evaluating the sum of posterior distributions $p_{nm}$ for data items for each part enables to generate calibration information in which all parts are recognized precisely. If the determination result is "YES," the process proceeds to Step S1210, or otherwise, to Step S1212.

At Step S1210, it is determined whether or not a predetermined process-termination condition is satisfied. The predetermined process-termination condition may be substantially the same as in Step S1202. If the determination result is "YES," the process ends as determined, or otherwise, the process proceeds to Step S1212.

At Step S1211, the data input unit 110 increments jj by only "1".

At Step S1212, the data input unit 110 obtains point cloud data related to the object to be processed at one point in time, the point cloud data corresponding to the jj-th data in the time series.

At Step S1214, the micro-fitting processing unit 150 executes a micro-fitting process based on the calibration information obtained successfully at Step S1208 and the point cloud data obtained at Step S1212. Note that the point cloud data used here is the point cloud data obtained at Step S1212, namely, obtained at a point in time (a second point in time) after the point in time (a first point in time) at which the point cloud data was obtained at Step S1204.

At Step S1216, the micro-fitting processing unit 150 determines whether or not the micro-fitting process has succeeded. Specifically, if determining that positions $c_k^\Theta$ and directions $e_k^\Theta$ that satisfy a second predetermined criterion have been derived in the micro-fitting process, the micro-fitting processing unit 150 determines that the micro-fitting process has succeeded. For example, if the sum of posterior distributions over data items and all parts is greater than or equal to a predetermined value Th2, the micro-fitting processing unit 150 determines that positions $c_k^\Theta$ and directions $e_k^\Theta$ that satisfy the second predetermined criterion have been derived. Evaluating the sum of posterior distributions over data items and all parts instead of the sum of posterior distributions for data items for each part, enables to continue the micro-fitting process even in a situation where some of the parts are not recognized precisely as long as the sum of posterior distributions over data items and all parts indicates a relatively favorable value. This is because in the micro-fitting, lack of data occurs only in joint rotation, and hence, a significant movement of the subject S is not overlooked. Also, in the micro-fitting, unlike the fitting in the single-scene skeleton recognition process, partial lack of data can be compensated for estimation with the rest of data. This enables to continuously obtain relatively high-precision skeleton information even when the subject S exhibits a complicated pose in which a majority of the feature points cannot be obtained, for example, the subject S is in a state of crouching. If the determination result is "YES," the process proceeds to Step S1210, and if the determination result is "YES" at Step S1210, the micro-fitting process is executed based on point cloud data related to the next frame. On the other hand, if the determination result is "NO," the process returns to Step S1202 to execute the single-scene skeleton recognition process again.

In this way, according to the process illustrated in FIG. 12, when a highly precise recognized result (calibration information) is obtained in the single-scene skeleton recognition process, the micro-fitting process can be executed based on the recognized result. This enables to increase the processing speed compared to the case of repeating the single-scene skeleton recognition process frame by frame. Also, if the recognition precision is reduced due to the subsequent micro-fitting process (when the sum of posterior distributions over data items and all parts becomes less than the predetermined value Th2), the single-scene skeleton recognition process may be executed again. Therefore, it is possible to prevent reduction of the recognition precision which is an inconvenience caused by the excessive continuation of the micro-fitting process. In this way, according to the process illustrated in FIG. 12, it is possible to achieve both improvement in the processing speed and assurance of a highly precise recognition result.

Figure 13:
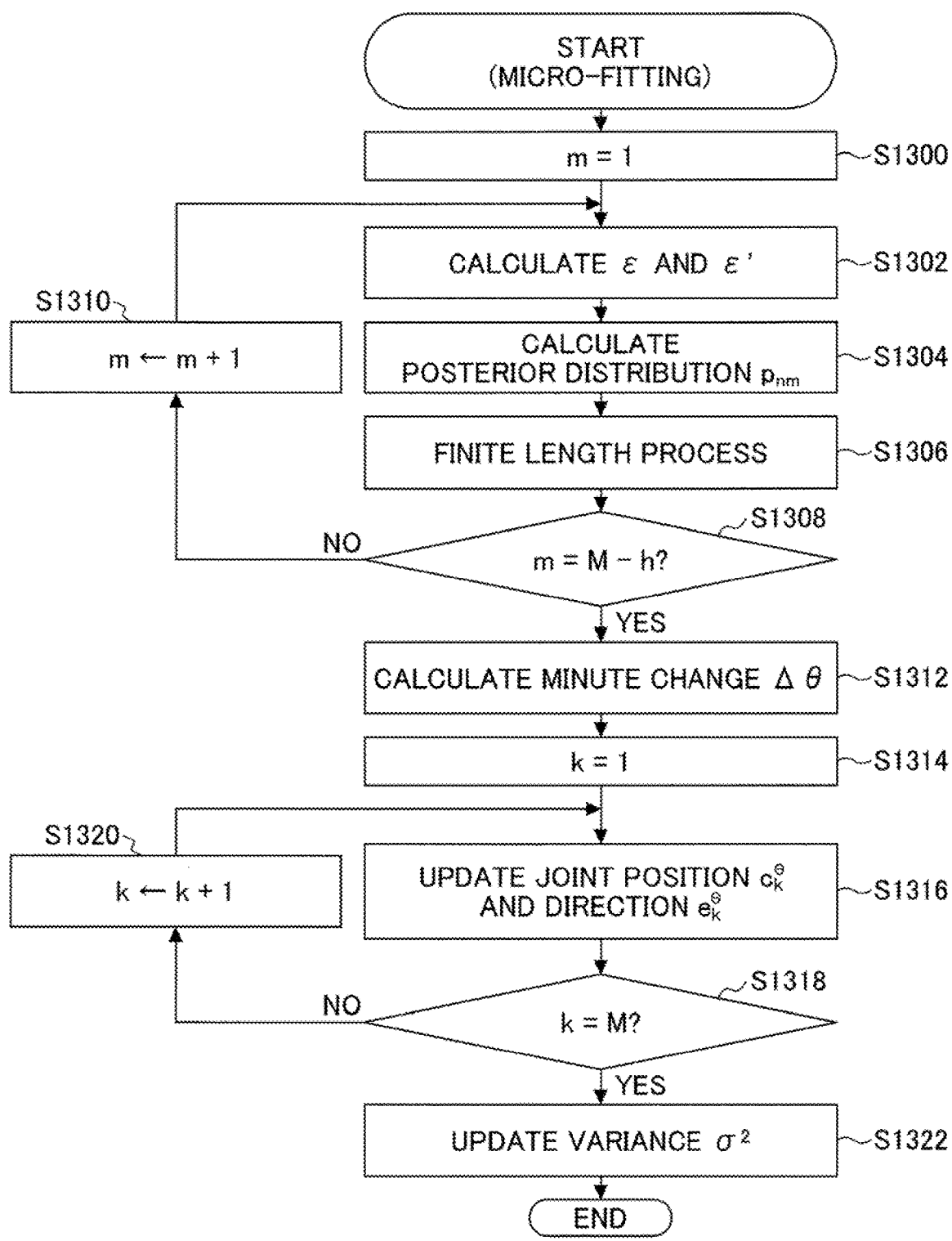
FIG. 13 is a schematic flow chart of an example of a micro-fitting process.

FIG. 13 is a schematic flow chart of a micro-fitting process and is an example of a process that can be executed at Step S1214.

At Step S1300, the micro-fitting processing unit 150 sets m=1.

At Step S1302, the surface residual calculation unit 151 calculates the surface residual $\varepsilon_{nm}$ and the differential $\varepsilon'_{nm}$ of the surface residual for a part m. The calculation methods of the surface residual $\varepsilon_{nm}$ and the differential $\varepsilon'_{nm}$ of the surface residual are as described above. Note that as described above, the calculation of the surface residual $\varepsilon_{nm}$ and the differential $\varepsilon'_{nm}$ of the surface residual for the part m depends on the geometric model associated with the part m. For example, if the geometric model is a cylinder, Formula 42 to Formula 45 may be used.

At Step S1304, the posterior distribution calculation unit 152 calculates the posterior distribution $p_{nm}$ with respect to the part m based on the point cloud data obtained at Step S1212 and the surface residual $s_{nm}$ obtained at Step S1302. The method of calculating the posterior distribution $p_{nm}$ is as described above (see Formula 51).

At Step S1306, the finite length processing unit 154 executes a finite length process based on the posterior distribution $p_{nm}$ obtained at Step S1304. The finite length process is as described above (see Formula 52).

At Step S1308, the micro-fitting processing unit 150 determines whether or not m=M−h. M−h is the total number of parts to be fit as described above. If the determination result is "YES," the process proceeds to Step S1312, or otherwise, the process returns to Step S1302 through Step S1310.

At Step S1310, the micro-fitting processing unit 150 increments m by only "1".

At Step S1312, the minute-change calculation unit 156 calculates a minute change $\Delta\theta$. At this time, the minute-change calculation unit 156 may collectively calculate elements $\Delta\theta_{l',i'}$, $\Delta\theta_{M-f+1,i'}$, and $\Delta\theta_{M-f+2,i'}$ of the minute change $\Delta\theta$ for all of l'=1, 2, . . . , M−f, and i'=0, X, XX. This calculation may be implemented, for example, by matrix operations.

At Step S1314, the micro-fitting processing unit 150 sets k=1.

At Step S1316, based on the minute change $\Delta\theta$ obtained at Step S1312, the parameter update unit 158 derives the position $c_k^{\Theta+\Delta\Theta}$ and the direction $e_k^{\Theta+\Delta\Theta}$, and updates the position $c_k^\Theta$ and the direction $e_k^\Theta$ with the position $c_k^{\Theta+\Delta\Theta}$ and the direction $e_k^{\Theta+\Delta\Theta}$ that have been derived. The derivations method of the position $c_k^{\Theta+\Delta\Theta}$ and the direction $e_k^{\Theta+\Delta\Theta}$ are as described above. Here, the initial values of the position $c_k^\Theta$ and the direction $e_k^\Theta$ are a position $c_k^{\Theta 0}$ and a direction $e_k^\Theta$, which have been obtained at immediately preceding Step S1206.

At Step S1318, the micro-fitting processing unit 150 determines whether or not k=M. M is the total number of parts of all parts as described above.

At Step S1320, the micro-fitting processing unit 150 increments k by only "1".

At Step S1322, the variance update unit 155 updates the variance $\sigma^2$ based on the surface residual $\varepsilon_{nm}$ obtained at Step S1302 and the posterior distribution $p_{nm}$ obtained at Step S1304. The update method of the variance 2 is as described above (see Formula 53).

As such, according to the process illustrated in FIG. 13, it is possible to update the position $c_k^\Theta$ and the direction $e_k^\Theta$ at a relatively high processing speed by using a result of the single-scene skeleton recognition process obtained at Step S1206 in FIG. 12. For example, compared to the case where iterative calculation is executed N times per frame, it is possible to achieve a processing speed that is N times faster.

Note that in the process illustrated in FIG. 13, processing at Step S1316 may be implemented by parallel processing. Meanwhile, in the micro-fitting process, the length of each part m is fixed; therefore, the position $c_k^\Theta$ may be calculated for only one part because once the position is obtained for the one part, it is possible to derive the positions for another part. However, in this case, the positions $c_k^\Theta$ need to be calculated by integrating results of the directions $e_k^\Theta$ of the parts; therefore, if the operations for the parts are executed in parallel, waiting time may be required for synchronization. In this regard, if both the position $c_k^\Theta$ and the direction $e_k^\Theta$ are calculated for each part, such synchronization can be avoided.

As above, the embodiments have been described in detail. Note that the present inventive concept is not limited to the specific embodiments, and various modifications and changes can be made within the scope described in the claims. Also, it is also possible to combine all or some of the elements in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object recognition method executed by a computer, the method comprising:
    obtaining point cloud data related to a surface of an object having a plurality of joints, from a sensor configured to obtain positional information in three dimensions;
    deriving or obtaining, based on the point cloud data at a first point in time, first parameters at the first point in time, the first parameters representing a position and an axial direction for each of a plurality of parts of the object; and
    deriving other first parameters at a second point in time after the first point in time, based on other point cloud data at the second point in time, the first parameters at the first point in time, and one or more geometric models each having an axis,
    the deriving of the first parameters at the first point in time includes performing a fitting process in which the one or more geometric models are fit into the point cloud data at the first point in time at a plurality of locations, to derive the first parameters at the first point in time based on the positions and the axial directions of the one or more geometric models fit into the point cloud data at the first point in time,
    the deriving of the other first parameters at the second point in time includes deriving the other first parameters at the second point in time based on the positions and the axial directions of the one or more geometric models fit into the other point cloud data at the second point in time,
    the deriving of the other first parameters at the second point in time is executed after the first parameters satisfying a first predetermined criterion are obtained by the fitting process, and the fitting process is repeated every cycle until the first parameters satisfying the first predetermined criterion are obtained,
    the fitting process includes:
    calculating first posterior distributions based on the point cloud data at the first point in time;
    determining whether a result of the deriving of the other first parameters at the second point in time satisfies a second predetermined criterion; and
    calculating second posterior distributions based on the other point cloud data at the second point in time,
    the second predetermined criterion is satisfied when a sum of the second posterior distributions for data items over all the plurality of parts is greater than or equal to a predetermined value.

2. The object recognition method as claimed in claim 1, wherein the obtaining of the point cloud data is executed per cycle, and
    wherein the second point in time is included in a cycle next to a cycle including the first point in time.

3. The object recognition method as claimed in claim 1, wherein the fitting process includes modeling noise included in the point cloud data with a uniform distribution.

4. The object recognition method as claimed in claim 1, wherein the one or more geometric models relate to at least one of a cylinder, a cone, a trapezoidal cylinder, an elliptical cylinder, an elliptical cone, and a trapezoidal elliptical cylinder, and
    wherein the deriving of the other first parameters at the second point in time is based on respective types of the one or more geometric models used for deriving the first parameters at the first point in time.

5. The object recognition method as claimed in claim 1, wherein the first predetermined criterion is satisfied when the number of the plurality of parts is greater than or equal to a predetermined number and a sum of the first posterior distributions for data items of each of the plurality of parts is greater than or equal to a first predetermined value.

6. The object recognition method as claimed in claim 1, wherein upon determining that the result of the deriving of the other first parameters at the second point in time does not satisfy the second predetermined criterion, re-executing the method starting from the deriving of the first parameters at a newly set first point in time.

7. The object recognition method as claimed in claim 6, wherein
    the plurality of parts include a plurality of first parts that can be associated with the one or more geometric models, and a plurality of second parts that cannot be associated with the one or more geometric models, and
    the second predetermined criterion is satisfied when a sum of the second posterior distributions for data items over the plurality of first parts is greater than or equal to the predetermined value.

8. The object recognition method as claimed in claim 7, wherein the calculating of the second posterior distributions includes, for each of the plurality of first parts, setting the second posterior distributions to 0 for a data item having a distance in an axial direction from a center in the axial direction of the one or more geometric models associated with said each of the plurality of first parts, among data items in the other point cloud data at the second point in time.

9. The object recognition method as claimed in claim 8, wherein the object is a human being or a humanoid robot, and
    wherein the plurality of second parts includes a part connecting a root joint of an arm part of the object with a joint in a trunk part of the object on a side of a head part of the object, and a part connecting a root joint of a leg part of the object with a joint in the trunk part of the object on a side of the trunk part of the object.

10. The object recognition method as claimed in claim 6, wherein upon determining that the result of the deriving of the other first parameters at the second point in time satisfies the second predetermined criterion, the method further comprising:
deriving new first parameters at a newly set second point in time, based on the result of the deriving of the other first parameters at the second point in time and new point cloud data in a cycle next to a cycle including the second point in time.

11. The object recognition method as claimed in claim 10, wherein the deriving of the other first parameters at the second point in time includes deriving, for each of the plurality of parts, second parameters representing respective changes in position and axial direction from the first point in time.

12. The object recognition method as claimed in claim 11, wherein the calculating of the second parameters includes a calculation process based on forward kinematics using a mechanistic model having a plurality of joints corresponding to the plurality joints of the object.

13. The object recognition method as claimed in claim 12, wherein the calculation process involves treating translation and rotation of a center of gravity of the object, and rotation of each of the plurality of joints as movements that exhibit minute changes.

14. The object recognition method as claimed in claim 13, wherein the plurality of parts include a movable part and an immovable part, and
wherein the mechanistic model is a model that gives three degrees of triaxial rotational freedom to joints connected with the movable part among the plurality of joints.

15. The object recognition method as claimed in claim 14, wherein the deriving of the second parameters includes omitting a calculation part in the calculation process related to joints connected with the immovable part among the plurality of joints.

16. The object recognition method as claimed in claim 14, wherein the deriving of the second parameters includes omitting a calculation part in the calculation process related to parts associated with an axially symmetric model among the plurality of parts, the calculation part being related to rotation around an axis.

17. An object recognition device comprising:
a memory; and
a processor configured to execute
obtaining point cloud data related to a surface of an object having a plurality of joints, from a sensor configured to obtain positional information in three dimensions;
deriving or obtaining, based on the point cloud data at a first point in time, first parameters at the first point in time, the first parameters representing a position and an axial direction for each of a plurality of parts of the object; and
deriving other first parameters at a second point in time after the first point in time, based on other point cloud data at the second point in time, the first parameters at the first point in time, and one or more geometric models each having an axis,
the deriving of the first parameters at the first point in time includes performing a fitting process in which the one or more geometric models are fit into the point cloud data at the first point in time at a plurality of locations, to derive the first parameters at the first point in time based on the positions and the axial directions of the one or more geometric models fit into the point cloud data at the first point in time,
the deriving of the other first parameters at the second point in time includes deriving the other first parameters at the second point in time based on the positions and the axial directions of the one or more geometric models fit into the other point cloud data at the second point in time,
the deriving of the other first parameters at the second point in time is executed after the first parameters satisfying a first predetermined criterion are obtained by the fitting process, and the fitting process is repeated every cycle until the first parameters satisfying the first predetermined criterion are obtained,
the fitting process includes:
calculating first posterior distributions based on the point cloud data at the first point in time;
determining whether a result of the deriving of the other first parameters at the second point in time satisfies a second predetermined criterion; and
calculating second posterior distributions based on the other point cloud data at the second point in time,
the second predetermined criterion is satisfied when a sum of the second posterior distributions for data items over all the plurality of parts is greater than or equal to a predetermined value.

18. An object recognition system comprising:
a sensor configured to obtain positional information in three dimensions;
a memory; and
a processor configured to execute
obtaining point cloud data related to a surface of an object having a plurality of joints, from the sensor configured to obtain positional information in three dimensions;
deriving or obtaining, based on the point cloud data at a first point in time, first parameters at the first point in time, the first parameters representing a position and an axial direction for each of a plurality of parts of the object; and
deriving other first parameters at a second point in time after the first point in time, based on other point cloud data at the second point in time, the first parameters at the first point in time, and one or more geometric models each having an axis,
the deriving of the first parameters at the first point in time includes performing a fitting process in which the one or more geometric models are fit into the point cloud data at the first point in time at a plurality of locations, to derive the first parameters at the first point in time based on the positions and the axial directions of the one or more geometric models fit into the point cloud data at the first point in time,
the deriving of the other first parameters at the second point in time includes deriving the other first parameters at the second point in time based on the positions and the axial directions of the one or more geometric models fit into the other point cloud data at the second point in time,
the deriving of the other first parameters at the second point in time is executed after the first parameters satisfying a first predetermined criterion are obtained by the fitting process, and the fitting process is repeated every cycle until the first parameters satisfying the first predetermined criterion are obtained, the fitting process includes calculating first posterior distributions based on the point cloud data at the first point in time;

determining whether a result of the deriving of the other first parameters at the second point in time satisfies a second predetermined criterion; and calculating second posterior distributions based on the other point cloud data at the second point in time, the second predetermined criterion is satisfied when a sum of the second posterior distributions for data items over all the plurality of parts is greater than or equal to a predetermined value.

19. A non-transitory computer-readable recording medium having an object recognition program stored thereon for causing a computer to execute a process, the process comprising:

obtaining point cloud data related to a surface of an object having a plurality of joints, from a sensor configured to obtain positional information in three dimensions;

deriving or obtaining, based on the point cloud data at a first point in time, first parameters at the first point in time, the first parameters representing a position and an axial direction for each of a plurality of parts of the object; and deriving other first parameters at a second point in time after the first point in time, based on other point cloud data at the second point in time, the first parameters at the first point in time, and one or more geometric models each having an axis, the deriving of the first parameters at the first point in time includes performing a fitting process in which the one or more geometric models are fit into the point cloud data at the first point in time at a plurality of locations, to derive the first parameters at the first point in time based on the positions and the axial directions of the one or more geometric models fit into the point cloud data at the first point in time, the deriving of the other first parameters at the second point in time includes deriving the other first parameters at the second point in time based on the positions and the axial directions of the one or more geometric models fit into the other point cloud data at the second point in time, the deriving of the other first parameters at the second point in time is executed after the first parameters satisfying a first predetermined criterion are obtained by the fitting process, and the fitting process is repeated every cycle until the first parameters satisfying the first predetermined criterion are obtained, the fitting process includes:

calculating first posterior distributions based on the point cloud data at the first point in time;

determining whether a result of the deriving of the other first parameters at the second point in time satisfies a second predetermined criterion; and calculating second posterior distributions based on the other point cloud data at the second point in time, the second predetermined criterion is satisfied when a sum of the second posterior distributions for data items over all the plurality of parts is greater than or equal to a predetermined value.

* * * * *